United States Patent
Yoshio et al.

(10) Patent No.: US 8,810,862 B2
(45) Date of Patent: Aug. 19, 2014

(54) PAPER MEDIUM INFORMATION ENCRYPTING SYSTEM, DECRYPTING SYSTEM, PROGRAM AND METHOD

(75) Inventors: Hitoshi Yoshio, Kahoku (JP); Satoru Arai, Kahoku (JP)

(73) Assignee: PFU Limited, Ishikawa (JP)

( * ) Notice: Subject to any disclaimer, the term of this patent is extended or adjusted under 35 U.S.C. 154(b) by 994 days.

(21) Appl. No.: 12/593,301

(22) PCT Filed: May 31, 2007

(86) PCT No.: PCT/JP2007/061111
§ 371 (c)(1),
(2), (4) Date: Sep. 28, 2009

(87) PCT Pub. No.: WO2008/146390
PCT Pub. Date: Dec. 4, 2008

(65) Prior Publication Data
US 2010/0091337 A1    Apr. 15, 2010

(51) Int. Cl.
H04N 1/40 (2006.01)
H04N 1/44 (2006.01)
G06K 9/00 (2006.01)
H04K 1/00 (2006.01)
G06K 7/10 (2006.01)

(52) U.S. Cl.
CPC .............. *H04N 1/44* (2013.01); *H04N 1/4493* (2013.01); *H04N 1/444* (2013.01)
USPC .......... 358/3.28; 358/1.9; 358/3.24; 382/100; 380/30; 235/462.01

(58) Field of Classification Search
None
See application file for complete search history.

(56) References Cited

U.S. PATENT DOCUMENTS

| | | | | |
|---|---|---|---|---|
| 5,287,203 A | * | 2/1994 | Namizuka | 358/443 |
| 5,398,283 A | * | 3/1995 | Virga | 380/243 |

(Continued)

FOREIGN PATENT DOCUMENTS

| | | | | |
|---|---|---|---|---|
| JP | 5-199424 A | | 8/1993 | |
| JP | 08-179689 | * | 7/1996 | .............. G09C 1/00 |
| JP | 8-179689 A1 | | 7/1996 | |
| JP | 2938338 B2 | | 8/1999 | |

(Continued)

OTHER PUBLICATIONS (JP08-179689 Was Cited by Applicant on IDS, filed Sep. 28, 2009. A Machine Translation of This Document Is Provided With This Office Action.).*

(Continued)

*Primary Examiner* — Steven Kau
(74) *Attorney, Agent, or Firm* — Westerman, Hattori, Daniels & Adrian, LLP

(57) ABSTRACT

Configuring a paper medium information encrypting system to include a digital image acquiring unit acquiring a digital image of information by capturing an image of a paper medium, an encryption area designating unit designating an encryption target partial area in the digital image, an image converting unit converting the image of the partial area into a processed image on the basis of an encryption key, a pixel value converting unit generating a converted image having a regularity at a spaced interval, used for specifying a position of the partial area when performing decryption, by regularly converting pixel values of the processed image, and an output unit outputting an encrypted image containing the converted image, wherein the encryption area designating unit designates, as the encryption target partial area, an area specified by an area designating information for specifying the area on the digital image.

7 Claims, 40 Drawing Sheets

(56) References Cited

U.S. PATENT DOCUMENTS

| | | | | |
|---|---|---|---|---|
| 6,166,750 | A * | 12/2000 | Negishi | 347/131 |
| 6,459,495 | B1 * | 10/2002 | Silverbrook | 358/520 |
| 6,786,420 | B1 * | 9/2004 | Silverbrook | 235/494 |
| 6,839,844 | B1 * | 1/2005 | Okano | 713/176 |
| 7,609,411 | B2 * | 10/2009 | Silverbrook et al. | 358/1.6 |
| 7,685,522 | B1 * | 3/2010 | Feuerman | 715/728 |
| 2006/0129844 | A1 * | 6/2006 | Oshikiri | 713/190 |
| 2007/0061595 | A1 * | 3/2007 | Chen | 713/193 |
| 2007/0089049 | A1 * | 4/2007 | Gormish et al. | 715/507 |
| 2008/0279380 | A1 | 11/2008 | Hayashi | |

FOREIGN PATENT DOCUMENTS

| | | |
|---|---|---|
| JP | 2000-232586 A | 8/2000 |
| JP | 2004-032538 A | 1/2004 |
| JP | 2006-080623 A | 3/2006 |

OTHER PUBLICATIONS

U.S. Appl. No. 12/425977 claims, filed Jan. 19, 2012.*
International Search Report of PCT/JP2007/061111, mailing date of Aug. 21, 2007.

* cited by examiner

*FIG. 3*

| IDENTIFYING INFORMATION | AREA DESIGNATING INFORMATION |
|---|---|
| 0001 | {(5, 10), (9, 10), (5, 12)}, {···}, ··· |
| 0002 | {(7, 10), (9, 10), (7, 12)}, {···}, ··· |
| 0003 | {(15, 3), (17, 3), (15, 12)}, {···}, ··· |
| ⋮ | ⋮ |

(A)  (B)

*FIG. 26*
(A) 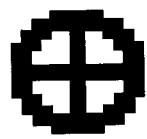  (B) 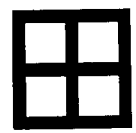  (C) 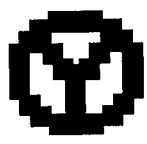  (D) 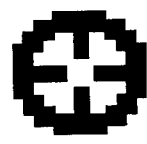

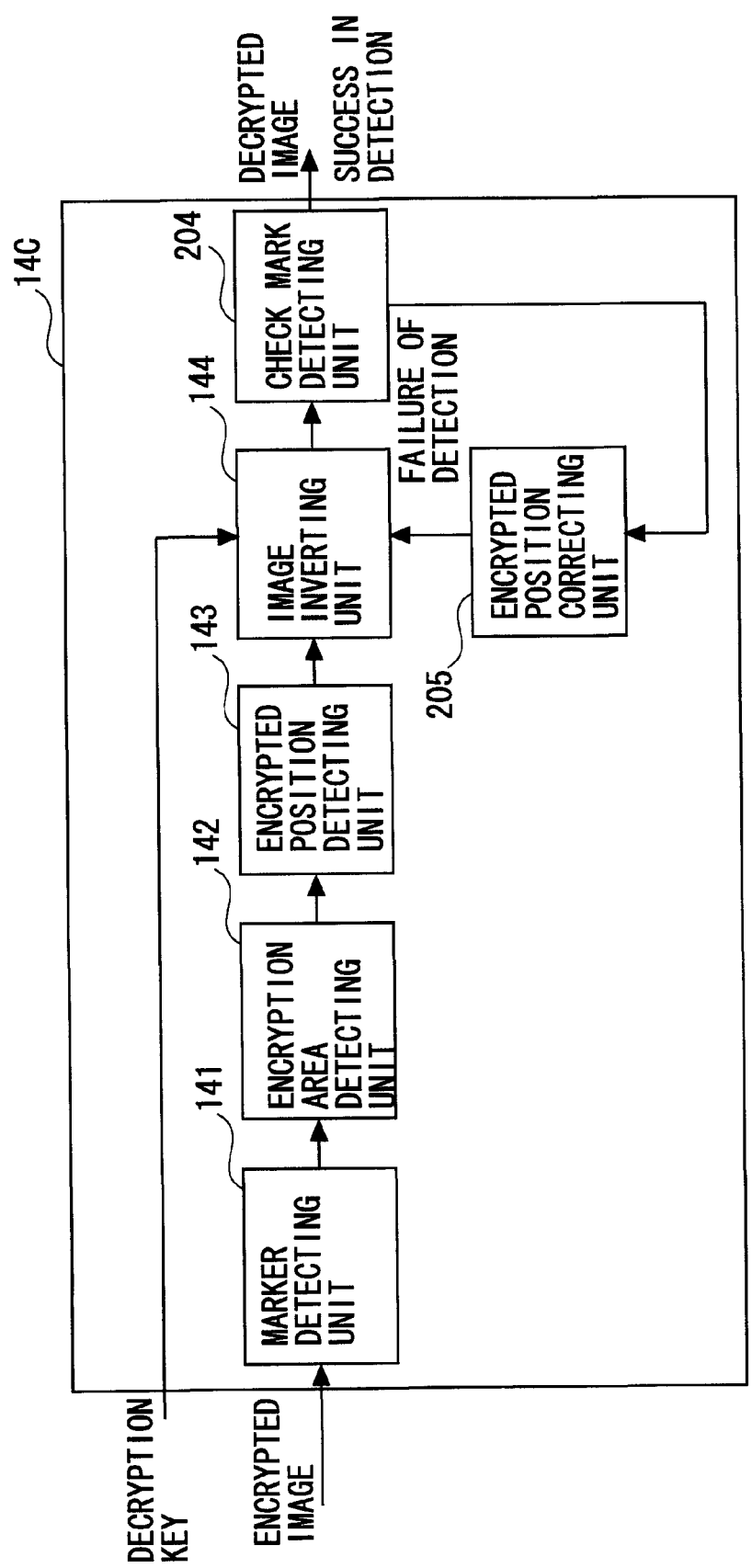

PAPER MEDIUM INFORMATION ENCRYPTING SYSTEM, DECRYPTING SYSTEM, PROGRAM AND METHOD

FIELD

The present invention relates to a technology of encrypting information recorded on a paper medium.

BACKGROUND

A technology of dealing with encryption of a printed matter is exemplified by a technology of, at first, segmenting a whole image into a plurality of blocks, rearranging images of the segmented blocks based on parameters obtained from an inputted password (encryption key), further black-and-white-inverting and mirror-inverting the images of the blocks designated by the parameters, and thus encrypting the images (refer to Patent document 1). On the occasion of decrypting the encrypted image, a positioning frame is attached to the outside of the image, and, after inputting the password (decryption key), the encrypted image is decrypted into the original image through procedures reversed to those for the encryption.

Another technology is that black-and-white squares having a predetermined size, which represent binary data, are arrayed in matrix and embedded into the printed matter (refer to Patent document 2). Further, for recognizing visualized positions on the occasion of decryption, positioning symbols are attached to predetermined positions of the matrix on the printed matter. Based on these positioning symbols, the image is captured by a scanner and a camera, and the embedded information is decrypted.

[Patent document 1] Japanese Patent Laid-Open Publication No. 8-179689

[Patent document 2] Japanese Patent Publication No. 2938338

SUMMARY

The information such as documents etc. has hitherto been dealt with and kept in a state of being recorded on paper mediums, however, over the recent years, various categories of information have been increasingly electronized, and, as the convenience of handling the electronized information has been improved, there is an increased frequency of dealing with and keeping the information in the electronized state.

The electronized information is, however, easy to copy and, besides, spreads rapidly in a broad area via a network such as the Internet, and consequently a problem is that if the important information leaks out, a profound influence arises.

On the other hand, the information recorded on the paper medium is incomparable with the electronized information in terms of a spreading speed and a spreading range if leaked out, however, if copied by a copying machine and carried out, there is a high possibility that the leakage itself might not be recognized. It is therefore considered that there are a great number of potential cases of occurrence of the leakage of the information recorded on the paper mediums.

Moreover, with an advancement of electronizing the information, the convenience of dealing with the electronized information is improved, and nevertheless the demands for the paper mediums are still high for the reason of the convenience peculiar to the paper mediums such as having a high look-through property, being easy to handwrite and being circulation-enabled as a corporeal thing.

It is an object of the present invention, in view of the problems given above, to prevent the leakage of the important information without losing the convenience of the paper medium.

The present invention adopts the following means in order to solve the problems given above. Namely, the present invention is a paper medium information encrypting system comprising: digital image acquiring means acquiring a digital image of information by capturing an image of a paper medium on which the information is recorded; encryption area designating means designating an encryption target partial area in the digital image acquired by the digital image acquiring means; image converting means converting the image of the partial area designated by the encryption area designating means into a processed image on the basis of an encryption key; pixel value converting means generating a converted image having regularity, used for specifying a position of the partial area on the occasion of decryption, by regularly converting pixel values of the processed image converted by the image converting means; and output means outputting the encrypted image containing the converted image processed by the pixel value converting means, wherein the encryption area designating means designates, as the encryption target partial area, an area specified by the area designating information for specifying the area on the digital image.

Herein, "the paper medium on which the information is recorded" connotes the paper on which to record some category of information such as a document, a graphic and an illustration irrespective of whether handwriting or printing. The digital image acquiring means captures an image of the paper medium by use of a scanner, a digital camera, etc., thereby acquiring the information, recorded on the paper medium, as a digital image. According to the present invention, the encrypted image is generated based on the digital image and output by the encryption area designating means, the image converting means and the pixel value converting means.

The encryption according to the present invention enables the partial area of the digital image to be designated and thus encrypted. Then, in the present invention, the encryption target area is designated by use of the area designating information. The area designating information contains the information for specifying the area on the digital image. The information for specifying the area is exemplified by positional information, size information, vector information and so on.

Further, the paper medium information encrypting system according to the present invention may further comprise area designating information acquiring means acquiring the area designating information on the basis of the information recorded on the paper medium.

It is feasible to configure the paper medium information encrypting system, wherein the optimal area designating information is automatically selected through only capturing the image of the paper medium by acquiring the area designating information on the basis of the information recorded on the paper medium.

For example, the paper medium information encrypting system according to the present invention may further comprise area designating information retaining means retaining the area designating information in a way that associates the area designating information with identifying information for identifying the area designating information, wherein the area designating information acquiring means may acquire the area designating information associated with the inputted identifying information in the pieces of area designating information retained by the area designating information retaining means.

The identifying information is the information associated with each of plural types of area designating information in a way that makes the area designating information identifiable, and is also the information used for designating the area designating information on the occasion of designating the encryption target area.

Moreover, the paper medium information encrypting system according to the present invention may further comprise identifying information acquiring means acquiring the identifying information recorded on the paper medium from the digital image acquired by the digital image acquiring means, wherein the area designating information acquiring means may acquire the area designating information associated with the identifying information acquired by the identifying information acquiring means in the pieces of area designating information retained by the area designating information retaining means.

The identifying information is previously attached to the paper medium, whereby the identifying information can be acquired from the digital image defined as the information obtained when capturing the image of the paper medium, and the paper medium can be associated with the area designating information that specifies which area should be encrypted in the information recorded on the paper medium.

Moreover, the paper medium information encrypting system according to the present invention may further comprise keyword detecting means reading a character string in the digital image acquired by the digital image acquiring means and detecting a keyword contained in the digital image by comparing the readout character string with the keyword defined as a predetermined character string, wherein the area designating information acquiring means may acquire the area designating information by generating the area designating information for specifying an area associated with the keyword detected by the keyword detecting means.

The keyword preferably involves using, in addition to the important information itself, a character string (e.g., an [address] and a [name]) etc. to which the important information is written anterior or posterior. This scheme enables the automatic encryption of the area in which to record, it is presumed, the important information in the information recorded on the imaged paper medium without performing such an operation that the plural types of area designating information are prepared, and the area designating information is selected when conducting the encryption.

Further, according to the present invention, the area designating information acquiring means may acquire the area designating information for designating a first partial area as an encryption target area and a second partial area as the encryption target area, and the image converting means may convert the first partial area and the second partial area into processed images based on the encryption keys different from each other.

Namely, according to the present invention, the different encryption keys are used for encrypting the different areas, thereby enabling the encryption of the paper medium that undergoes access control based on the encryption key and setting of a security level.

Still further, the present invention is a paper medium information decrypting system comprising: encrypted image acquiring means acquiring an encrypted image recorded on a paper medium by capturing an image of the paper medium; decryption area designating means designating, as a decryption area becoming a decryption target area, an encryption area in the encrypted image acquired by the encrypted image acquiring means; encrypted position detecting means detecting the encrypted position where pixel values are regularly converted in the decryption area designated by the decryption area designating means; decrypting means decrypting the decryption area into a digital image on the basis of the encrypted position detected by the encrypted position detecting means and a decryption key; and output means outputting the digital image decrypted by the decrypting means, wherein the decryption area designating means designates, as the decryption area, an area specified by the area designating information for specifying the area on the encrypted image.

Yet further, the present invention can be grasped as a method executed by a computer or as a program for making the computer function as the respective means. Moreover, the present invention may also be a recording medium recorded with the program that can be read by the computer, other devices, machines, etc. Herein, the recording medium readable by the computer etc. connotes a recording medium capable of storing information such as data, programs, etc. electrically, magnetically, optically, mechanically or by chemical action, which can be read from the computer and so on.

According to the present invention, the leakage of the important information can be prevented without losing the convenience of the paper medium.

BRIEF DESCRIPTION OF THE DRAWINGS

FIG. 3 A diagram showing a structure of an area designating information table in the embodiment.

FIG. 26 A diagram showing an example of a positioning marker used for the encrypting process.

FIG. 40 A diagram showing an outline of the decrypting process in the third mode.

DESCRIPTION OF EMBODIMENTS

Embodiments of the present invention will be described based on the drawings.

Figure 1:
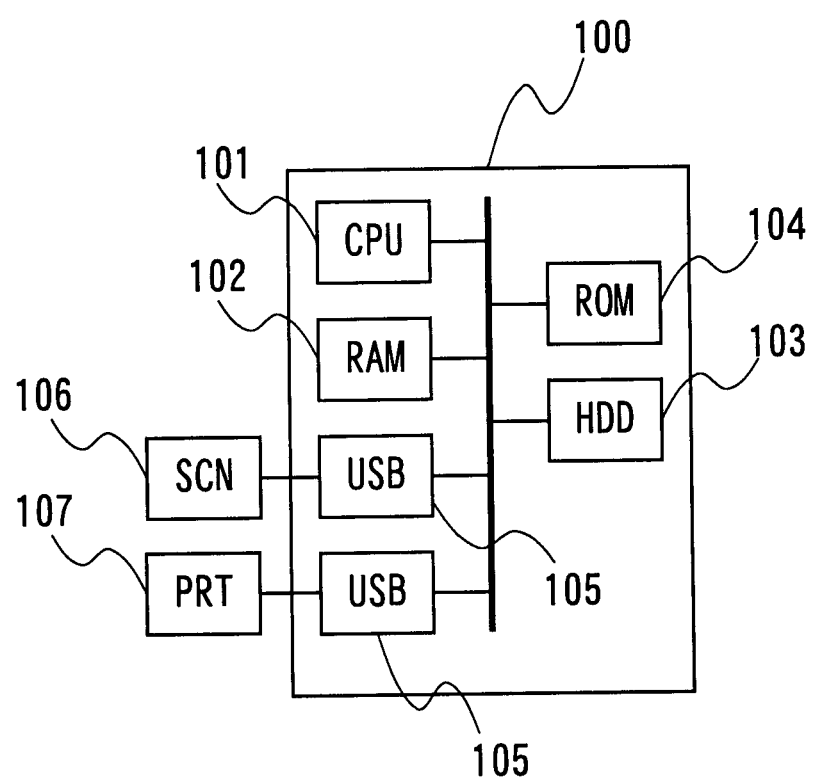
FIG. 1 A diagram showing an outline of a hardware architecture of a paper medium information encrypting system or a paper medium information decrypting system according to an embodiment.

FIG. 1 is a diagram showing an outline of a hardware architecture of a paper medium information encrypting system or a paper medium information decrypting system according to an embodiment. A paper medium information encrypting system 200 or a paper medium information decrypting system 500 includes a computer 100, a scanner 106 and a printer 107 that are connected to the computer 100. Herein, the computer 100 is a computer including a CPU (Central Processing Unit) 101, a main storage device such as a RAM (Random Access Memory) 102, an auxiliary storage device such as a HDD (Hard Disk Drive) 103, a ROM (Read-Only Memory) 104 and a USB (Universal Serial Bus) interface 105, wherein the scanner 106 and the printer 107 are connected to the USB interface 105.

First Embodiment

Figure 2:
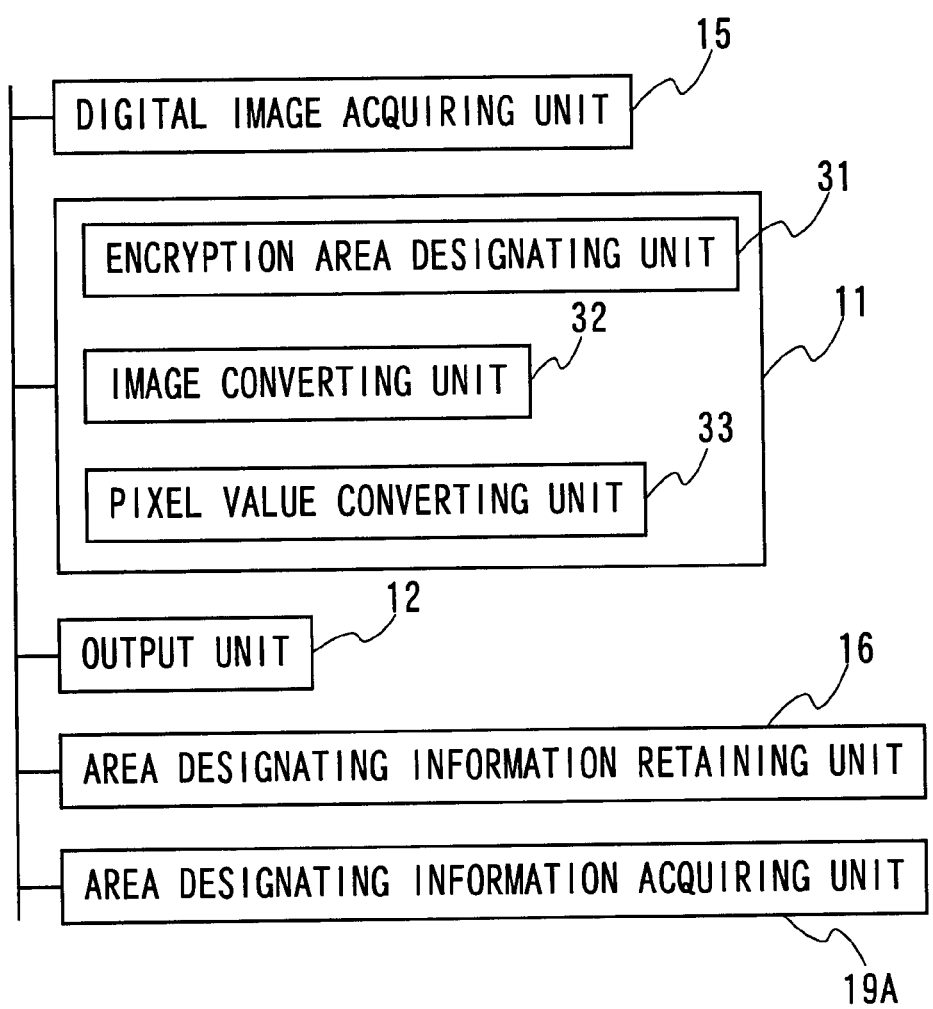
FIG. 2 A diagram illustrating an outline of a functional configuration of the paper medium information encrypting system according to the embodiment.

FIG. 2 is a diagram illustrating an outline of a functional configuration of the paper medium information encrypting system 200 according to the first embodiment. The paper medium information encrypting system 200 is, the CPU 101 executing a paper medium information encrypting program read from the HDD 103 and developed on the RAM 102, thereby made to function as a digital image acquiring unit 15 that captures an image of the paper medium and acquires a digital image, an encrypting unit 11 that generates an encrypted image by encrypting at least part of the acquired digital image, an output unit 12 that outputs the thus-generated encrypted image, an area designating information retaining unit 16 that retains information for designating an area to be encrypted by the encrypting unit 11, and an area designating information acquiring unit 19A that displays options to a user and accepts an input of a selected result.

The digital image acquiring unit 15 captures the image of the paper medium, thereby acquiring the information on the paper medium as the digital image. In the first embodiment, the scanner 106 and the computer 100 executing a scanner driver correspond to the digital image acquiring unit 15. The digital image may, however, be acquired by use of other types of devices capable of imaging the paper medium, such as a digital camera.

The encrypting unit 11 includes an encryption area designating unit 31 that designates an encryption target partial area of the digital image acquired by the digital image acquiring unit 15, an image converting unit 32 that converts the image of the designated partial area into a processed image based on an encryption key, and a pixel value converting unit 33 that generates a converted image having regularity, which is used for specifying a position of the partial area when decrypting, by regularly converting pixel values of the thus-converted processed image. An in-depth description of the encrypting process by the encrypting unit 11 will be made later on.

The output unit 12 outputs the encrypted image generated by the encrypting unit 11 through a display means, a printing means, etc. In the first embodiment, the printer 107 and the computer 100 executing a printer driver correspond to the output unit 12. The output may, however, be an output to the display device such as a monitor and may also be an output to the storage device such as the HDD 103 of an electronic file containing the information on the generated encrypted image.

The area designating information retaining unit 16 retains the area designating information containing positional information specifying a position on the digital image, as the area designating information for designating the encryption target partial area. Plural pieces of area designating information are managed in an area designating information table in a way that associates each piece of area designating information with unique identifying information.

FIG. 3 is a diagram illustrating a structure of the area designating information table in the first embodiment. In the area designating information table, the area designating information containing the positional information for specifying the area in the digital image is so recorded as to be associated with the unique identifying information. The area designating information is the information containing the positional information for designating the encryption area in the digital image. The information used for designating the encryption area embraces the positional information for specifying the position in the digital image, size information, vector information and so on. The encryption area is designated by any one or more of these categories of information. For example, the encrypting process, which will be described later on, involves using 3-point positional information for designating a rectangular encryption area. The positional information can be expressed generally by use of units of centimeter, inch, pixel, etc. along an x-axis and a y-axis orthogonal to the x-axis (see FIG. 3). Further, a position from an edge of the digital image along the x-axis and the y-axis may be expressed by a percentage (%), wherein a width or a length of the digital image is used as a unit. Another thinkable method is that numbers are allocated to all of the pixels of the digital image (for example, serial numbers are allocated to the pixels starting with the left upper pixel and ending with the right lower pixel), and the position is specified by employing these numbers.

Figure 4:
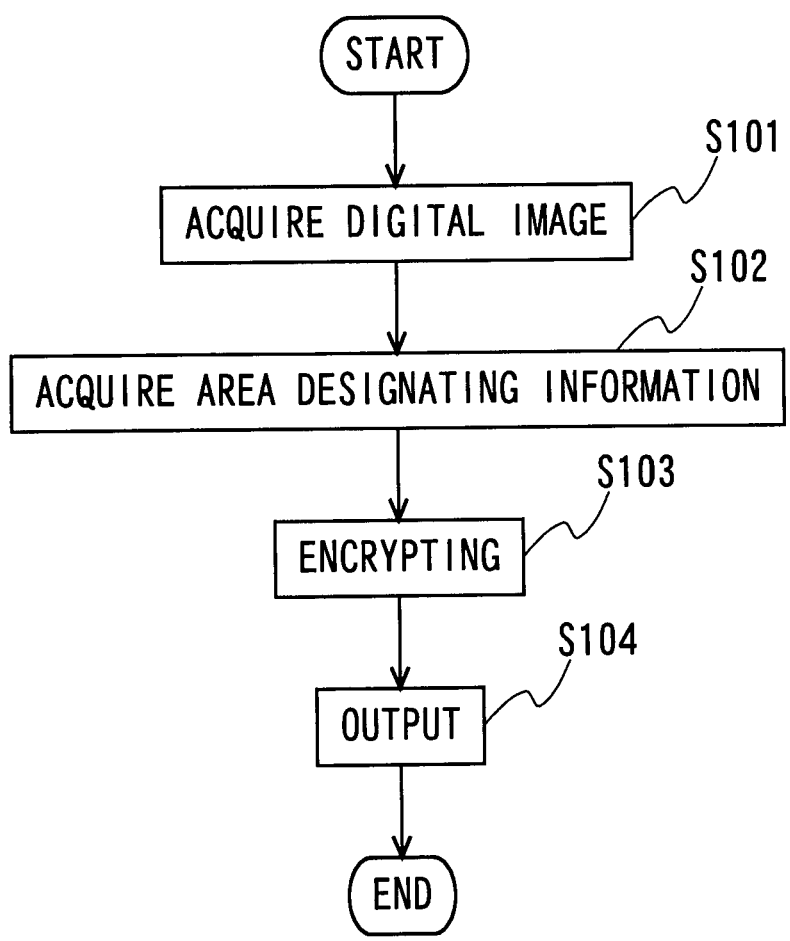
FIG. 4 A flowchart showing a flow of a paper medium information encrypting process in the embodiment.

FIG. 4 is a flowchart showing a flow of the paper medium information encrypting process in the first embodiment. The process shown in this flowchart is started in such a way that the paper medium information encrypting program is, based on the user's operation, read from the HDD 103, developed on the RAM 102 and executed by the CPU 101.

In step S101, the digital image is acquired. The user, after setting a paper medium recorded with the want-to-encrypt information on the scanner 106, gives an acquisition start instruction via an interface of the computer 100 or the scanner 106. The digital image acquiring unit 15 accepting an input of this instruction controls the scanner 106 to capture an image of the paper medium, and acquires the digital image by converting the imaging result into the digital image. Thereafter, the processing proceeds to step S102.

In step S102, the area designating information is designated. The area designating information acquiring unit 19A reads a candidate of the area designating information from the area designating information retaining unit 16, and displays, on a display (of which an illustration is omitted), an interface via which to prompt the user to select on the basis of the readout area designating information. The area designating information acquiring unit 19A accepts an input of the user's selection and specifies the area designating information related to the user's selection. Thereafter, the processing proceeds to step S103.

In step S103, the encryption is carried out. The encrypting unit 11 encrypts the area, of the digital image, designated by the area designating information specified in step S102, thereby generating the encrypted image. Details of the encrypting process will be described later on. Thereafter, the processing proceeds to step S104.

In step S104, the encrypted image is output. The computer 100 is, the CPU 101 executing the paper medium information encrypting program, thereby made to print (output) the encrypted image generated in step S103 to the paper medium via the printer 107. Thereafter, the process shown in this flowchart is terminated.

Figure 5:
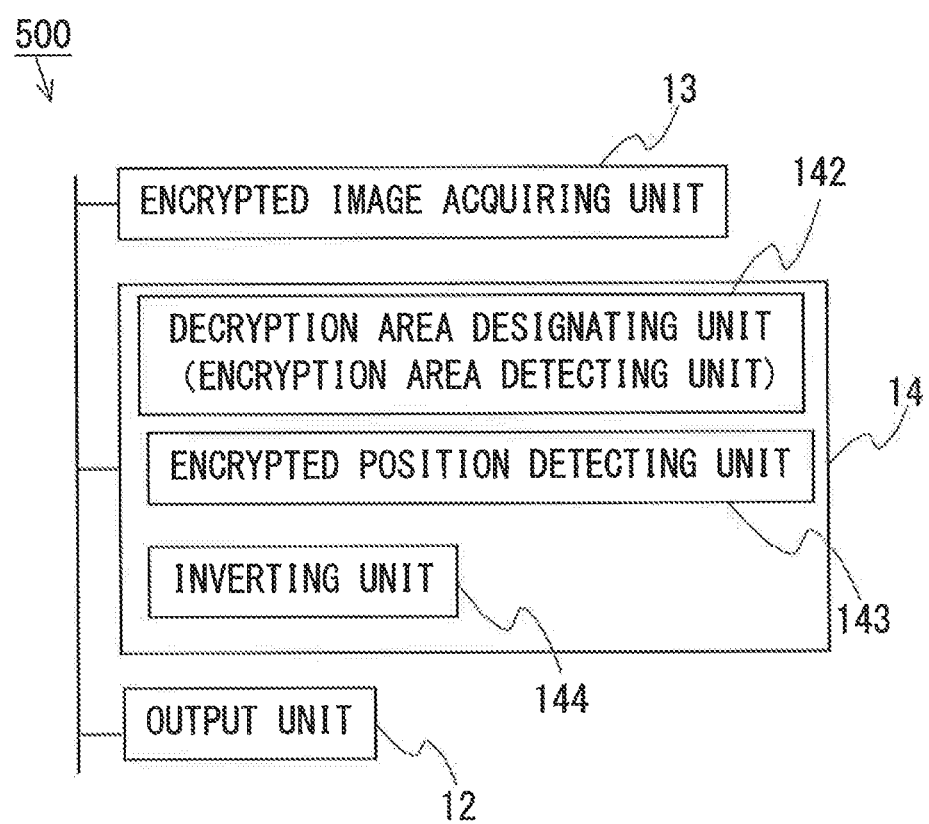
FIG. 5 A diagram illustrating an outline of a functional configuration of a paper medium information decrypting system according to the embodiment.

FIG. 5 is a diagram illustrating an outline of a functional configuration of the paper medium information decrypting system 500 according to the first embodiment. The paper medium information decrypting system 500 is, the CPU 101 executing a paper medium information decrypting program read from the HDD 103 and developed on the RAM 102, thereby made to function as an encrypted image acquiring unit that captures the image of the paper medium and thus acquires the encrypted image on the paper medium, a decrypting unit 14 that generates a decrypted digital image by decrypting at least part of the acquired digital image, and an output unit 12 that outputs the decrypted digital image.

The encrypted image acquiring unit 13 captures the image of the paper medium and thereby acquires the information on the paper medium as the encrypted image. In the first embodiment, the scanner 106 and the computer 100 executing the scanner driver correspond to the encrypted image acquiring unit 13. The digital image may, however, be acquired by use of other types of devices capable of imaging the paper medium, such as the digital camera.

The decrypting unit 14 has a decryption area designating unit (encryption area detecting unit) 142 that designates a decryption target area in the encrypted image acquired by the encrypted image acquiring unit 13, an encrypting position detecting unit 143 that detects an encrypting position, in which the pixel values are regularly converted, in the designated decryption area, and an inverse-converting unit (decrypting unit) 144 that decrypts the decryption area into the digital image on the basis of the detected encrypting position and a decryption key. An in-depth description of the decrypting process by the decrypting unit 14 will be made later on.

The output unit 12 outputs the digital image decrypted by the decrypting unit 14 through the display means, the printing means and so on. In the first embodiment, the printer 107 and the computer 100 executing the printer driver correspond to the output unit 12. The output may, however, be an output to the display device such as a monitor and may also be an output to the storage device such as the HDD 103 of the electronic file containing the information of the generated digital image.

Figure 6:
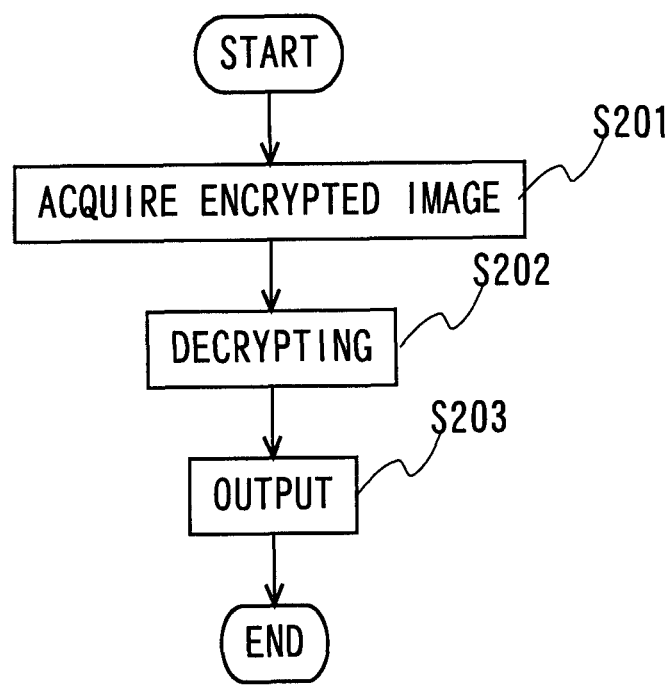
FIG. 6 A flowchart showing a flow of a paper medium information decrypting process in the embodiment.

FIG. 6 is a flowchart showing a flow of the paper medium information decrypting process in the first embodiment. The process shown in this flowchart is started in such a way that the paper medium information decrypting program is, based on the user's operation, read from the HDD 103, developed on the RAM 102 and executed by the CPU 101.

In step S201, the encrypted image is acquired. The user, after setting the paper medium recorded with the want-to-decrypt information on the scanner 106, gives an acquisition start instruction via the interface of the computer 100. The encrypted image acquiring unit 13 accepting an input of this instruction controls the scanner 106 to capture an image of the paper medium, and acquires the encrypted image by converting the imaging result into the encrypted image. Thereafter, the processing proceeds to step S202.

In step S202, the decryption is conducted. The decrypting unit 14 detects the encryption area in the encrypted image and decrypts the encryption area, thereby generating the decrypted digital image. An in-depth description of the decrypting process will be made later on. Thereafter, the processing proceeds to step S203.

In step S203, the digital image is output. The computer 100 is, the CPU 101 executing the paper medium information decrypting program, thereby made to print (output) the digital image generated in step S202 to the paper medium via the printer 107. Thereafter, the process shown in this flowchart is terminated.

Thus, in the decrypting process, the encryption area is automatically detected, and the detected area is decrypted, thereby enabling only the user knowing the decryption key to browse the information described on the encryption area. The decryption area may also, however, be determined according to the area information selected by the user in a way that displays the area information selecting interface same as in the case of the encrypting process. Decryption accuracy can be improved by applying the decryption area auto detecting process to the area designated by the user.

According to the first embodiment, the important information can be prevented from being leaked out without losing any convenience of the paper medium. Further, the image is output to the paper medium, and consequently it is feasible to obtain such an effect that, if copied by use of a copying machine etc, the encrypted image gets deteriorated, and the decryption is disabled if copied repeatedly. This effect enables prevention of the important documents from being easily copied by the copying machine and of the important information from leaking out. Moreover, a possible scheme is that the paper medium on which the encrypted image is printed involves using a special paper medium (so-called copy forgery preventive paper) in which a character image [Copy] etc appears when copied by the copying machine etc, or such a latent character image is printed simultaneously with printing the encrypted image, thereby restraining an easy copy and disabling the decryption from the copy due to noises being embedded in the encrypted image by an overlap of the sensitized character image.

It is to be noted that the first embodiment has described the encrypting system 200 and the decrypting system 500 as the different systems, however, the present invention may be realized as a paper medium information encrypting/decrypting system including both of the encrypting function and the decrypting function. This mode is the same with second and third embodiments which will hereinafter be discussed.

Second Embodiment

Figure 7:
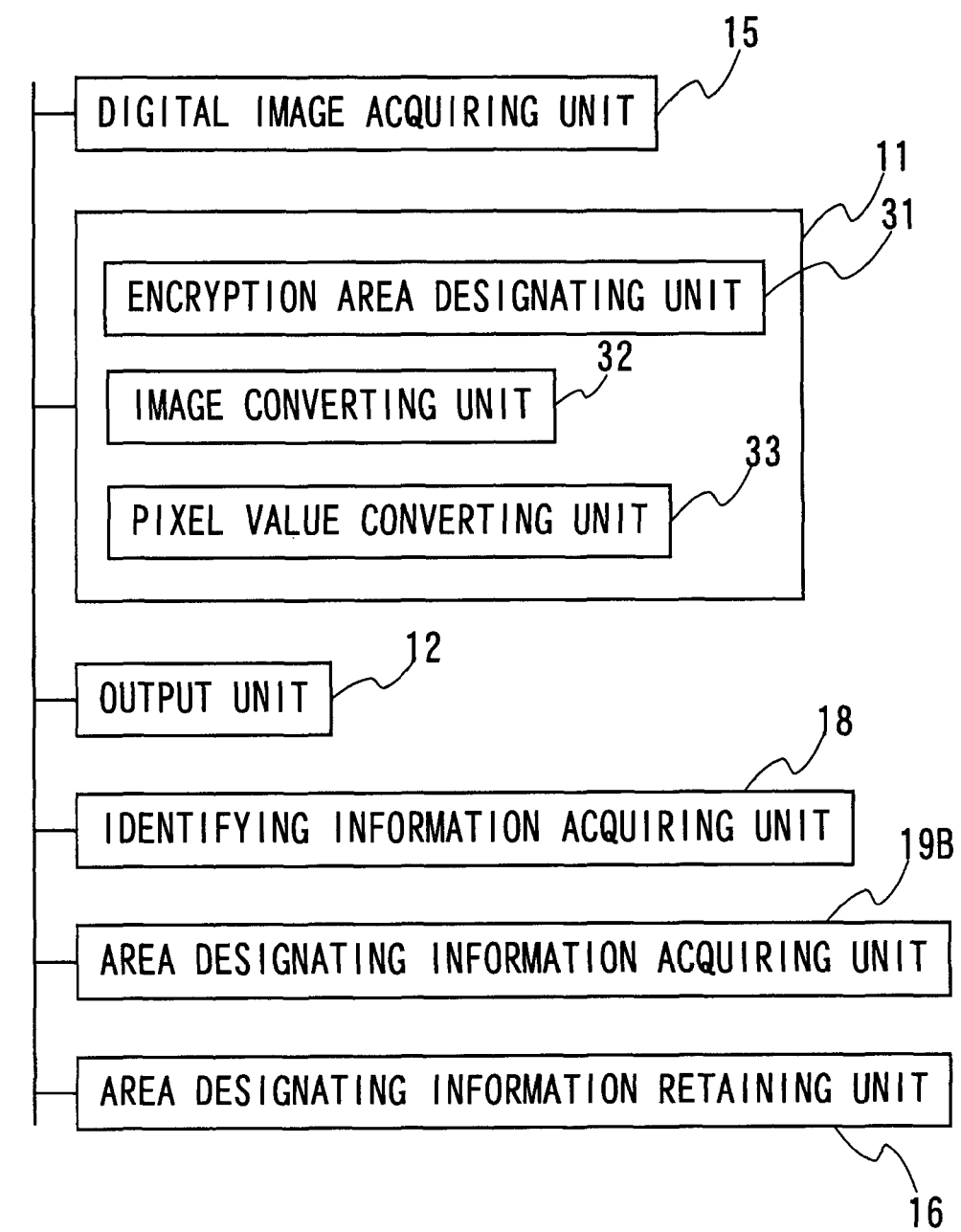
FIG. 7 A diagram illustrating an outline of a functional configuration of the paper medium information encrypting system according to the embodiment.

FIG. 7 is a diagram showing an outline of a functional configuration of a paper medium information encrypting system 200B according to a second embodiment. The paper medium information encrypting system 200B according to the second embodiment includes, in the same way as in the first embodiment, the digital image acquiring unit 15, the encrypting unit 11, the output unit 12 and the area designating information retaining unit 16, and further includes an identifying information acquiring unit 18 that acquires identifying information recorded on the paper medium and an area designating information acquiring unit 19B that acquires the related area designating information according to the acquired identifying information.

Figure 8:
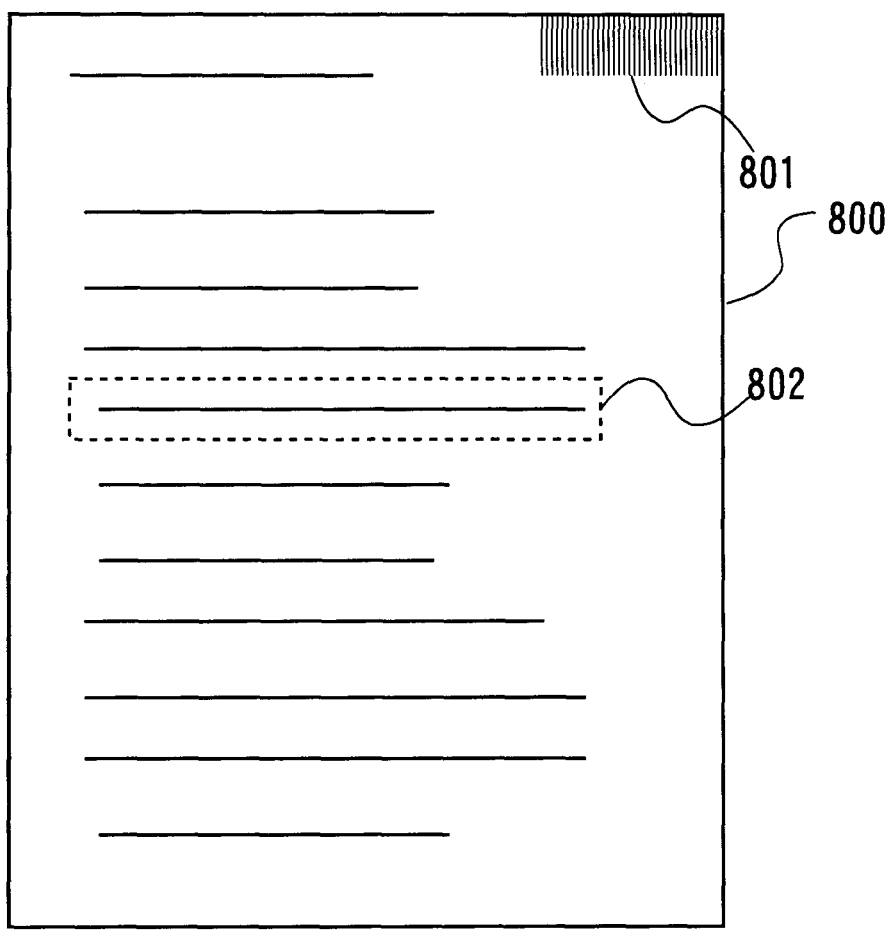
FIG. 8 A diagram showing an example of the paper medium on which identifying information is printed together with encryption target information.

The identifying information acquiring unit acquires the identifying information recorded on the paper medium in order to identify the area designating information for encrypting the information on the paper medium. The identifying information is previously printed on the paper medium in a readable form such as barcodes and printed alphanumeric characters by use of a so-called barcode recognition technology, an OCR (Optical Character Recognition) technology, an OMR (Optical Mark Recognition) technology, etc. FIG. 8 is a diagram illustrating an example of a paper medium 800 on which a piece of identifying information 801 is printed together with the encryption target information. It is preferable that the identifying information 801 is printed in a pre-determined position such as any one of four corners of the paper medium 800 in order to make the identifying information 801 easily readable. Further, the identifying information 801 is associated with area indicating information that indicates the area for encrypting a partial area 802 in the paper medium 800 on which the identifying information 801 is printed.

The area designating information acquiring unit 19B searches for the area designating information retained by the area designating information retaining unit 16 in a way that uses, as a search key, the identifying information acquired by the identifying information acquiring unit 18, and thus acquires the area designating information associated therewith. Namely, the identifying information of the area designating information for designating the should-be-encrypted part of the information recorded on the paper medium is previously printed in the barcode format etc. on the paper medium, thereby automatically selecting the optimum area designating information without causing the user to do any time-consuming operation for selecting the area designating information and enabling the should-be-encrypted part to be encrypted.

Figure 9:
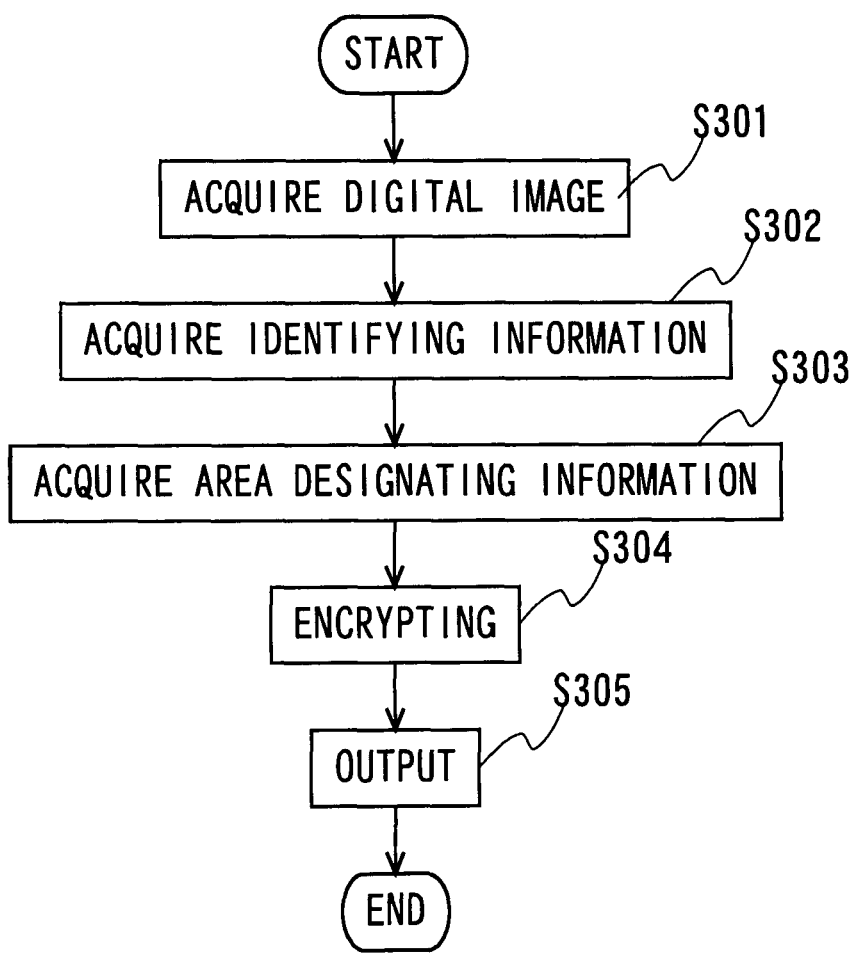
FIG. 9 A flowchart showing a flow of the paper medium information encrypting process in the embodiment.

FIG. 9 is a flowchart showing a flow of the paper medium information encrypting process in the second embodiment. The process shown in this flowchart is started in such a way that the paper medium information encrypting program is, based on the user's operation, read from the HDD 103, developed on the RAM 102 and executed by the CPU 101.

In step S301, the digital image is acquired. The details of the process are substantially the same as those in step S101 described above, and hence the explanation is omitted. Thereafter, the processing proceeds to step S302.

In step S302, the identifying information is acquired. The identifying information acquiring unit 18 acquires the identifying information from the digital image obtained in step S301. The identifying information acquiring unit 18 acquires the identifying information in the digital image by employing the so-called barcode recognition technology, the OCR technology, the OMR technology, etc. Thereafter, the processing proceeds to step S303.

In step S303, the area designating information is acquired. The area designating information acquiring unit 19B searches, based on the identifying information obtained in step S302, for the area designating information retained by the area designating information retaining unit 16, and thus acquires the area designating information associated therewith. Thereafter, the processing proceeds to step S304.

The processes shown in step S304 and step S305 are substantially the same as the processes in step S103 and S104, and hence their explanations are omitted.

The identifying information is acquired, and the associated area designating information is selected, thereby enabling the user to omit the time-consuming operation for designating the area designating information and the operation efficiency to be improved. Especially in the case of encrypting batchwise the documents taking plural patterns of fixed formats, the encryption can be performed extremely simply by use of the paper medium on which the identifying information corresponding to the fixed format is printed.

In the same way as in the first embodiment, in the decrypting process, the encryption area is automatically detected, and the detected area is decrypted, thereby enabling only the user knowing the decryption key to browse the information described in the encryption area. In the decrypting process, however, the identifying information may be acquired, and the corresponding decryption area may also be determined. The decryption area auto detecting process is applied to the area designated based on the identifying information, whereby the decryption accuracy can be improved.

Third Embodiment

Figure 10:
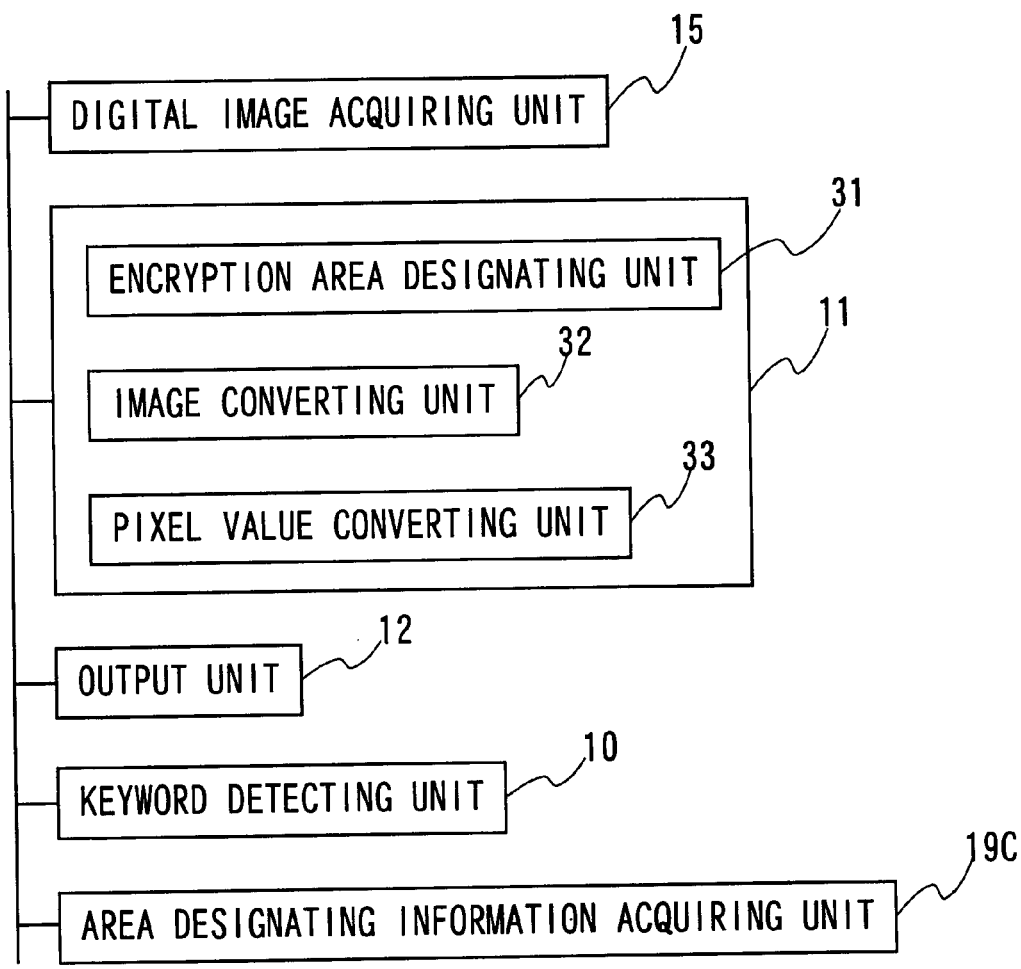
FIG. 10 A diagram illustrating an outline of a functional configuration of the paper medium information encrypting system according to the embodiment.

FIG. 10 is a diagram showing an outline of a functional configuration of a paper medium information encrypting system 200C according to a third embodiment. The paper medium information encrypting system 200C according to the third embodiment includes, in the same way as in the first embodiment, the digital image acquiring unit 15, the encrypting unit 11 and the output unit 12, and further includes a keyword detecting unit 10 that detects a predetermined keyword from the information recorded on the paper medium, and an area designating information acquiring unit 19C that acquires the related area designating information according to a position associated with the detected keyword.

Figure 11:
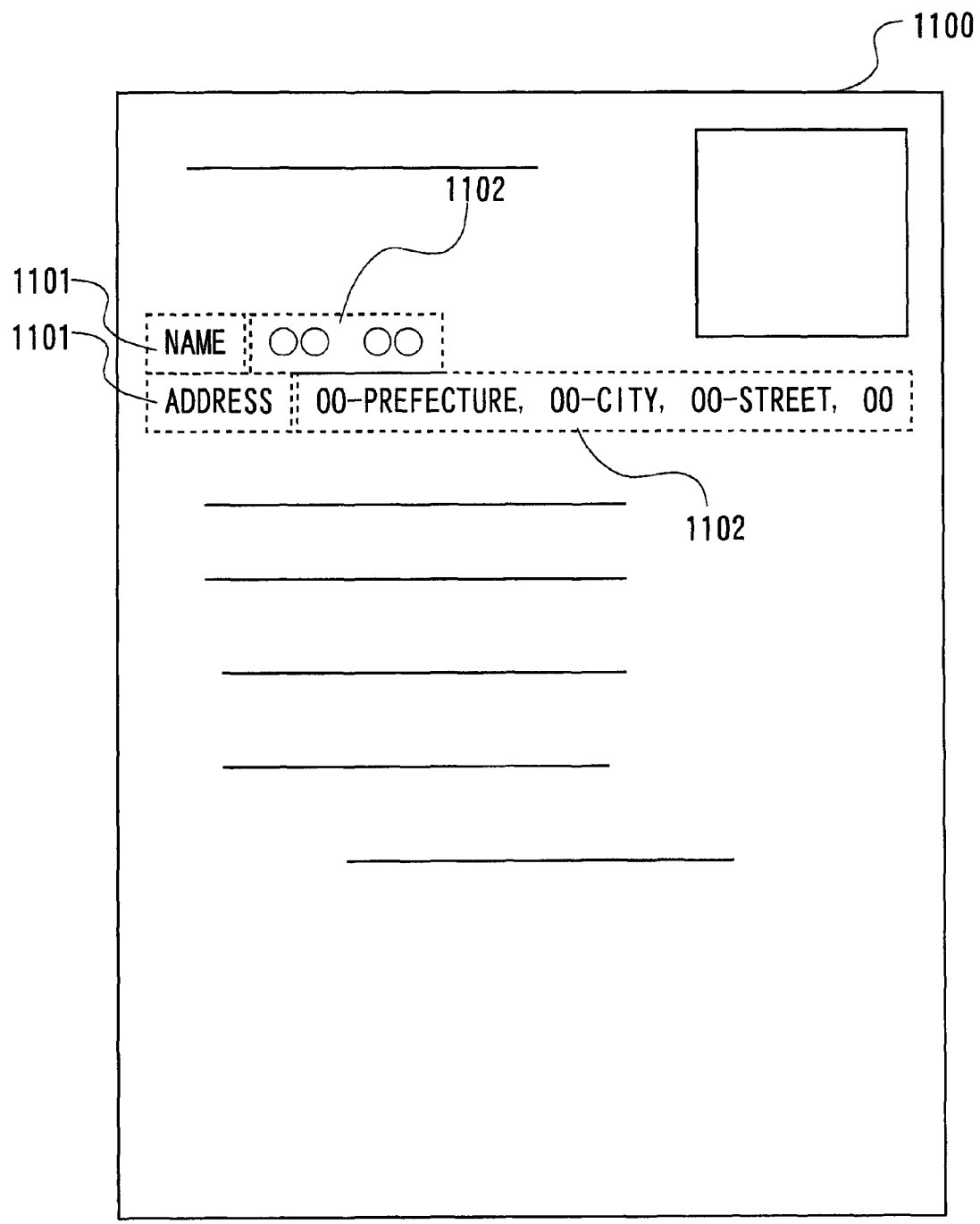
FIG. 11 A diagram showing an image of the paper medium on which a keyword is recorded.

The keyword detecting unit 10 reads a character string in the digital image acquired by the digital image acquiring unit 15, and compares the readout character string with a keyword defined as a predetermined character string, thereby detecting the keyword contained in the digital image. Herein, the keyword is the character string set for extracting existence or non-existence of the should-be-encrypted information and the position of the should-be-encrypted information from the information recorded on the paper medium. FIG. 11 is a diagram illustrating an image of a paper medium 1100 on which the keyword is recorded. For example, if a [name] and an [address] are set as keywords, it is determined whether these keywords are contained in the information on the paper medium 1100, and, if contained, positional information of a position 1101 where these keywords are described is acquired. Namely, character strings subsequent to these keywords can be inferred to be individual information such as the name and the address, so that it is possible to obtain the information that should be automatically encrypted and the area designating information representing an area 1102 in which to describe this item of information. On this occasion, the detection accuracy can be improved by referring to a name list that covers person's names generally often used in the case of the name and referring to an address list in the case of the address.

The area designating information acquiring unit 19C according to the third embodiment generates the area designating information for specifying the area associated with the keyword detected by the keyword detecting means. Generally, this is the area designating information for specifying the area of the character string subsequent to the keyword. If the want-to-encrypt character string itself is set as the keyword, however, the information representing the area in which to describe the keyword detected by the keyword detecting means becomes the area designating information.

Figure 12:
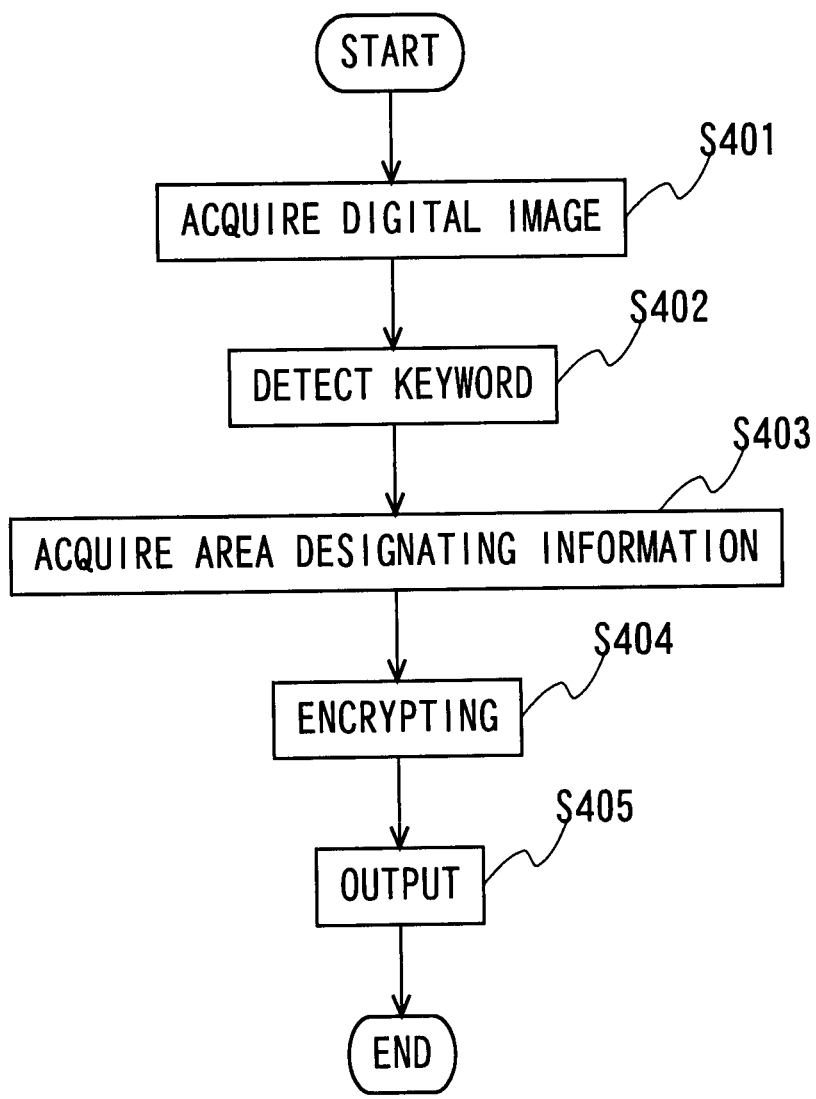
FIG. 12 A flowchart showing a flow of the paper medium information encrypting process in the embodiment.

FIG. 12 is a flowchart showing a flow of the paper medium information encrypting process in the third embodiment. The process shown in this flowchart is started in such a way that the paper medium information encrypting program is, based on the user's operation, read from the HDD 103, developed on the RAM 102 and executed by the CPU 101.

In step S401, the digital image is acquired. The details of the process are substantially the same as those in step S101 described above, and hence the explanation is omitted. Thereafter, the processing proceeds to step S402.

In step S402, the keyword is detected. The keyword detecting unit 10 detects the predetermined keyword from the digital image acquired in step S401 by use of the so-called OCR technology. Thereafter, the processing proceeds to step S403.

In step S403, the area designating information is acquired. The area designating information acquiring unit 19C generates the area designating information for specifying the area associated with the keyword in accordance with a position of the keyword detected in step S402. To be specific, if the keyword is a title of the want-to-encrypt information, the area designating information representing the area in which to describe the information subsequent to the keyword is generated. Further, if the keyword specifies the want-to-encrypt information itself, the area designating information representing the area in which the keyword is described is generated. The method by which the area designating information designates the area involves using the positional information, the size information, the vector information, etc. in the same way as by the method described in the first embodiment. Thereafter, the processing proceeds to step S404.

The processes shown in step S404 and step S405 are substantially the same as the processes shown in step S103 and step S104, and therefore the explanations are omitted.

Over the recent years, there has increasingly been importance of protecting the individual information, and in many cases the important information such as the individual information is described subsequent to the specified keyword like the [name], the [address], a [telephone number], etc. According to the third embodiment, the keyword is detected from the encryption target document etc., and the corresponding area is automatically encrypted, whereby a quantity of operation conducted when encrypting the information described in a variety of formats can be reduced.

Similarly to the first embodiment, in the decrypting process, the encryption area is automatically detected, and the detected area is decrypted, thereby enabling only the user knowing the decryption key to browse the information described in the encryption area. In the decrypting process, however, the keyword is detected, and the corresponding decryption area may also be determined. The decryption area auto detecting process is applied to the positional information of the detected keyword, whereby the decryption accuracy can be improved.

Figure 13:
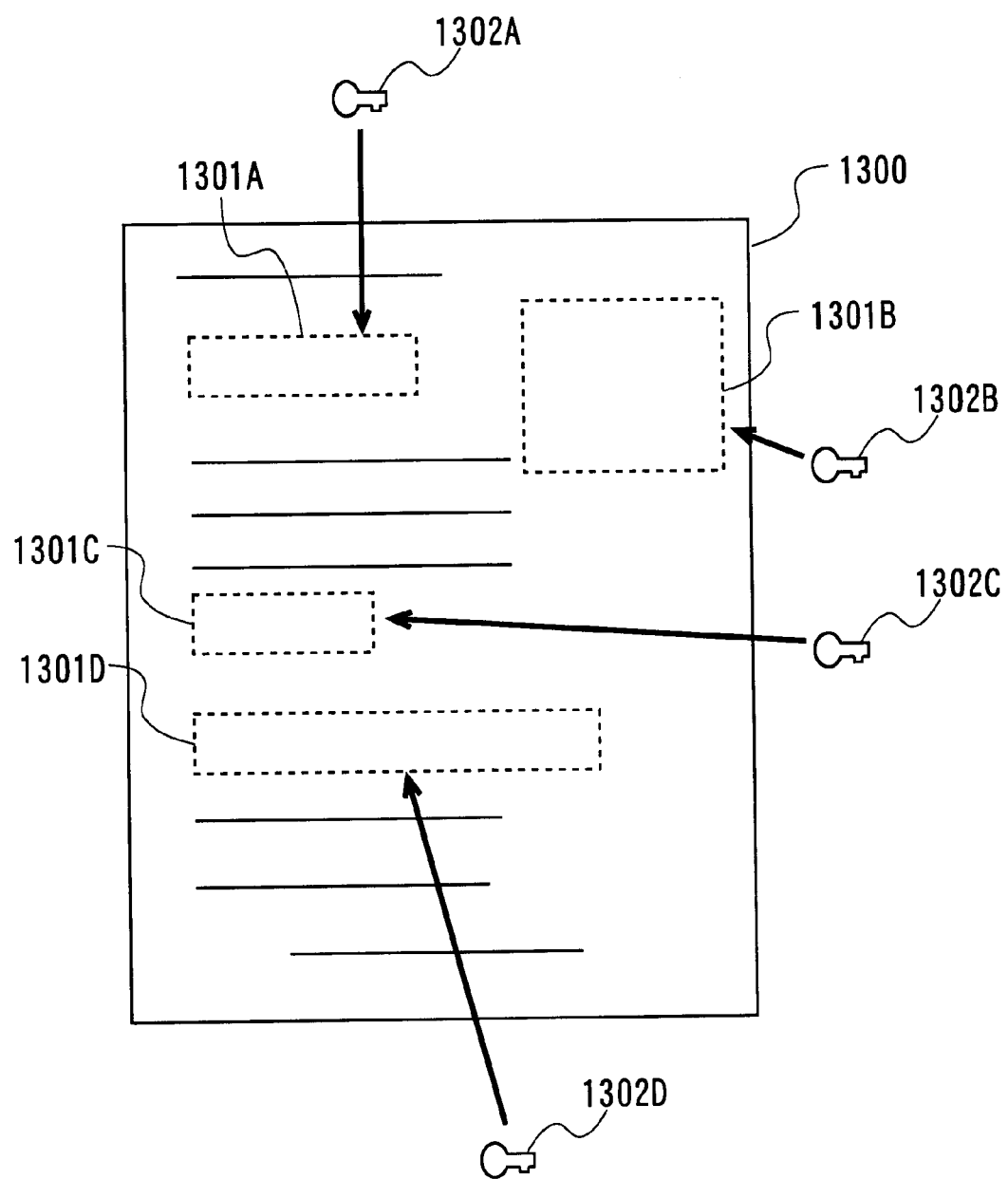
FIG. 13 A diagram showing an image of the paper medium that is encrypted by use of a plurality of encryption keys.

Further, in the first through third embodiments, a plurality of areas on the single paper medium may be encrypted with encryption keys different from each other. FIG. 13 is a diagram illustrating an image of a paper medium 1300 encrypted by employing the plurality of encryption keys. When areas 1301A, 1301B, 1301C and 1301D exist, these areas 1301A, 1301B, 1301C and 1301D are encrypted with corresponding encryption keys 1302A, 1302B, 1302C and 1302D, thereby enabling a browsing authority to be set on an area-by-area basis.

<Encrypting Unit and Decrypting Unit>

Next, outlines of the encrypting process by the encrypting unit and of the decrypting process by the decrypting unit in the first through third embodiments, will be explained.

Figure 14:
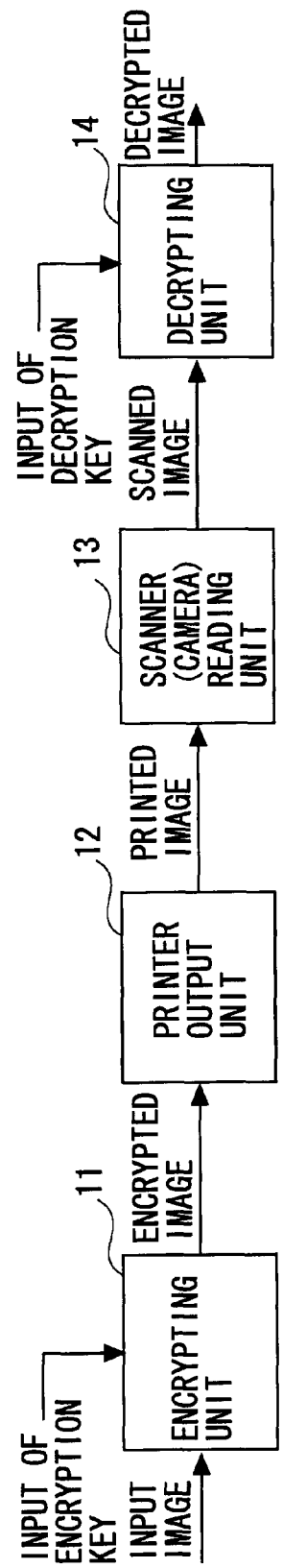
FIG. 14 A diagram showing a processing outline (part 1) of the encrypting process and the decrypting process.

FIG. 14 is a diagram showing a processing outline (part 1) of the encrypting process and the decrypting process. In FIG. 14, the encrypting unit (which is referred to as an encrypting unit 11A, encrypting unit 11B and an encrypting unit 11C in first through third modes, respectively) outputs the encrypted image into which part of the digital image has been encrypted on the basis of the inputted digital image and the encryption key specifying the encrypting method. The printer output unit 12 prints the digital image encrypted by the encrypting unit 11 on a printable physical medium such as the paper. The scanner (camera) reading unit 13 reads the printed image output by the printer output unit 12 by employing the scanner or the camera.

Then, the decrypting unit 14 (which is termed a decrypting unit 14A, a decrypting unit 14B and a decrypting unit 14C in the first through third modes, respectively) obtains the printed image output by the printer output unit 12 and the decrypted image with the inputted decryption key. As far as the inputted decryption key is valid, the encrypted image can be properly decrypted, and the information hidden with the encryption by the encrypting unit 11 gets visible.

Figure 15:
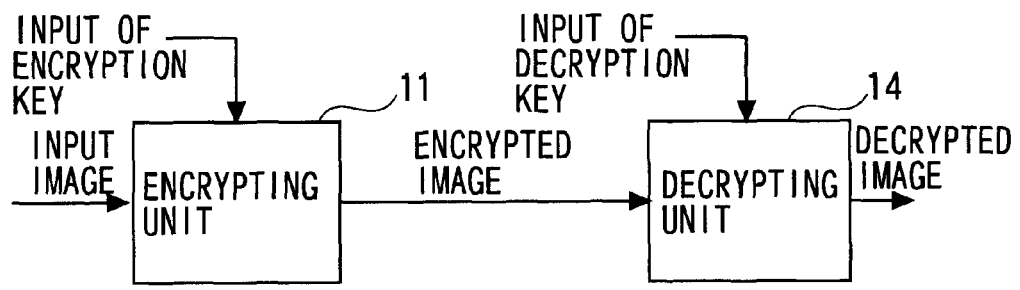
FIG. 15 A diagram showing a processing outline (part 2) of the encrypting process and the decrypting process.

FIG. 15 is a diagram showing a processing outline (part 2) of the encrypting process and the decrypting process. As shown in FIG. 15, the encrypting process and the decrypting process in the first through third modes to which the present invention is applied, enable the decrypted image to be acquired by inputting the digital image encrypted by the encrypting unit 11 in an as-is state of the electronic document image without via the printer and the scanner to the decrypting unit 14.

Next, the first through the third modes to which the present invention is applied will be described, respectively. To begin with, the first mode to which the present invention is applied will be described.

Figure 16:
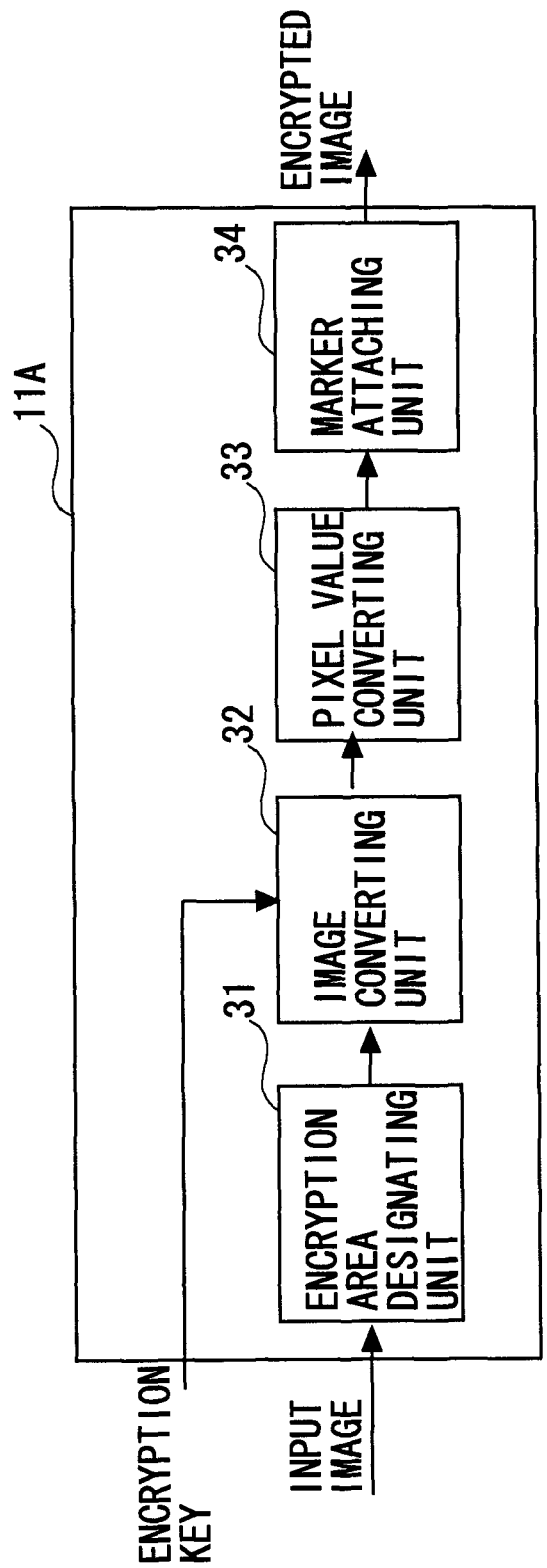
FIG. 16 A diagram showing an outline of the encrypting process in a first mode.

FIG. 16 is a diagram illustrating an outline of the encrypting process in the first mode. In FIG. 16, the encrypting unit 11A includes an encryption area determining (designating) unit 31, an image converting unit 32, a pixel value converting unit 33 and a marker adding unit 34.

The encryption area designating (determining) unit 31 selects an area to be encrypted from the inputted image containing the want-to-encrypt area.

Figure 17:
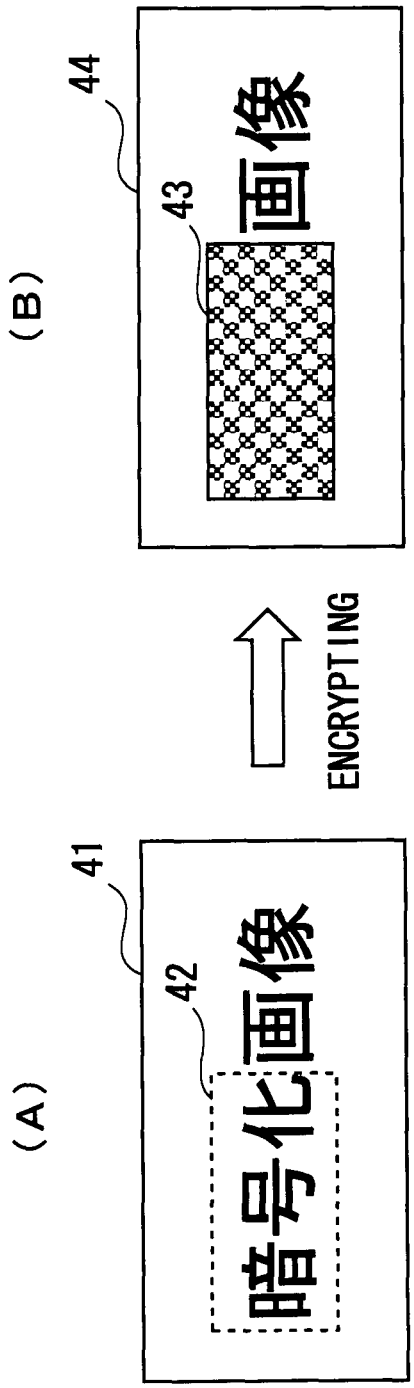
FIG. 17 A diagram showing an example of selecting an encryption area.

FIG. 17 is a diagram showing an example of selecting the encryption area. To be specific, the encryption area designating unit 31 selects, as illustrated in (A) of FIG. 17(A), an area 42 to be encrypted out of a digital image (inputted image) 41 containing the want-to-encrypt area. The area 42 is converted into a converted image 43 as illustrated in (B) of FIG. 17 by the processes of the image converting unit 32 and the pixel value converting unit 33 that will hereinafter be described, and the digital image 41 is converted into an encrypted image 44 containing the converted image 43.

The discussion gets back to the description in FIG. 16. When the encryption area designating unit 31 selects the area 42 to be encrypted, the image converting unit 32 inputs the to-be-encryption area 42 and the encryption key, and visually converts [[the]] an image of the to-be-encryption area 42 by a converting method associated with the encryption key. A conversion parameter on this occasion is generated based on binary data obtained from the inputted encryption key.

Figure 18:
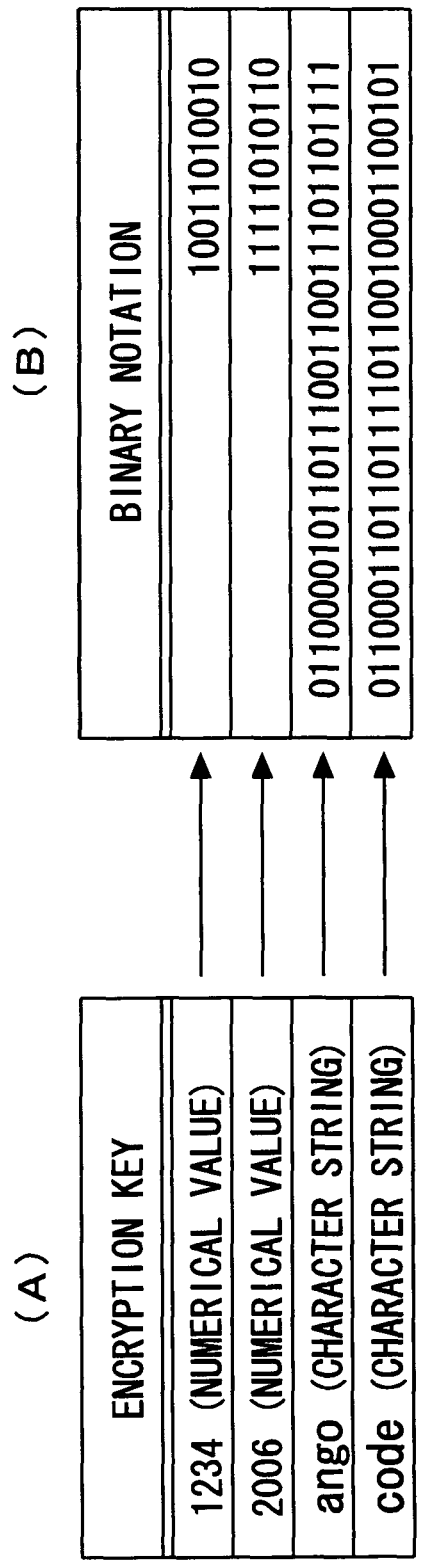
FIG. 18 A diagram showing an input example of the encryption key.

FIG. 18 is a diagram showing an example of inputting the encryption key. FIG. 18 shows an example of the encryption key and an example of the binary data generated from the encryption key. For example, a numeric value [1234] used as the encryption key is inputted in the form of binary data [100011010010], and a character string [ango] as the encryption key is inputted in the form of binary data [01100001011011100110011101101111].

The first mode exemplifies, as the image converting methods, two converting methods, i.e., one method based on a process (called a scramble process) of segmenting the image into micro areas and rearranging the micro areas and another method based on an image compression process.

To start with, the scramble process will be described. The scramble process is that at first the image of the selected area 42 is segmented into the micro areas each having a fixed size, and next the micro areas are rearranged based on the binary data obtained from the encryption key.

Figure 19:
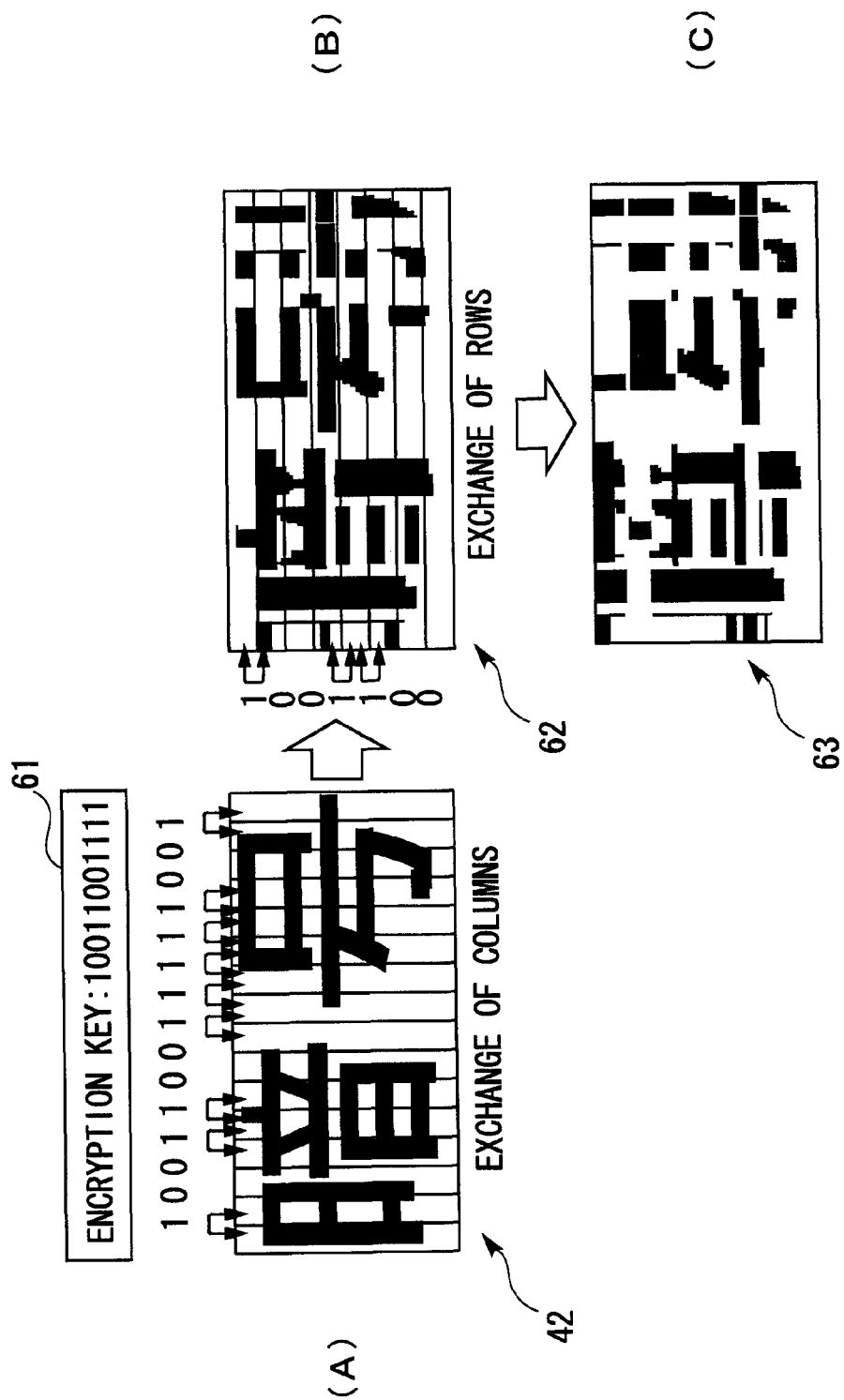
FIG. 19 A diagram showing one example of a scramble process in an image converting unit.

FIG. 19 is a diagram showing one example of the scramble process by the image converting unit. As shown in (A) of FIG. 19, at the first onset, the area 42 selected by the encryption area designating unit 31 is segmented in a vertical direction, respective bits of a binary string of the encryption key 61 are set corresponding to borders between the segmented areas (micro areas) 42 in sequence from the left, when the bit is [1], neighboring segmented columns (segmented areas) are exchanged with each other, and, when the bit is [0], an execute-nothing-process is conducted in sequence from the left side. If the bit count of the binary string is insufficient for a segmentation border count, the same binary string is repeated from a position where the insufficiency occurs, thus performing the exchanging process up to the right end of the area 42.

Subsequently, as shown in (B) of FIG. 19, an image area 62 undergoing the exchange process is segmented in a horizontal direction, the respective bits of the binary string of the encryption key 61 is set corresponding to the borders between the segmented image areas 62 in sequence from above, and the same exchanging process as done for the vertical segmentation is executed sequentially from above on a row-by-row basis.

Then, as illustrated in (C) of FIG. 19, as a result of executing the exchanging process on the individual segmented images, a scramble image 63, defined as a processed image into which the original area 42 has been subjected to the scramble process, is acquired.

An extension method of this exemplified scramble process can involve executing the scramble process twice or more both in the horizontal direction and in the vertical direction, and can further involve changing the size of the segmented area in the exchange conducted from the second time onward. Moreover, different binary strings can be also employed for exchanging the segmented areas in the horizontal direction and in the vertical direction. These extension methods are, if a size of the inputted image is small while a bit length of the encryption key is large, effective especially as a means for preventing absolutely the same processed image from being generated based on the different encryption key.

Figure 20:
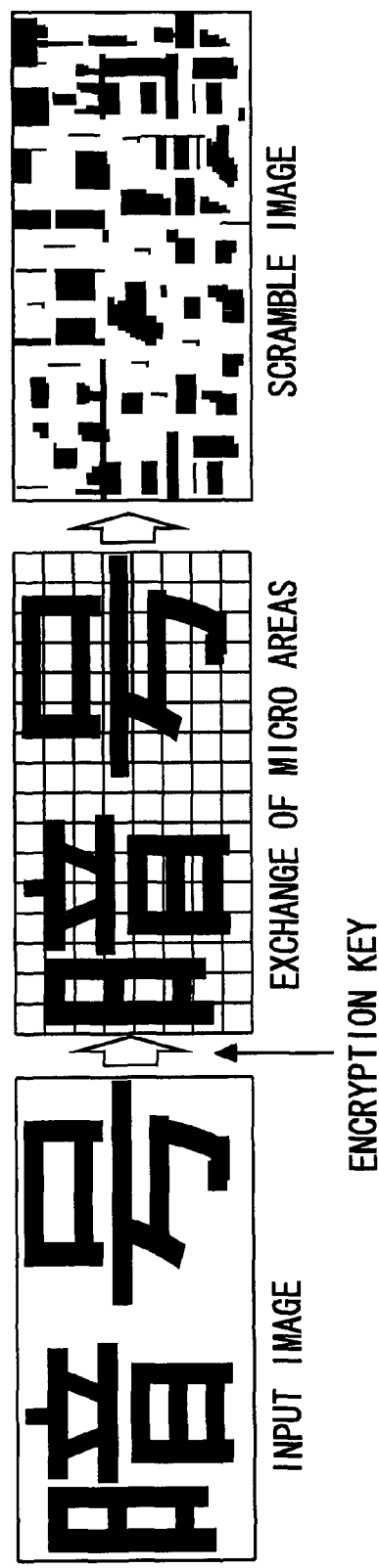
FIG. 20 A diagram showing another example of the scramble process in the image converting unit.

FIG. 20 is a diagram illustrating another example of the scramble process in the image converting unit. A method of exchanging the pixels on the unit of the micro area as illustrated in FIG. 20 can be used as another scramble processing method different from the scramble process explained with reference to FIG. 19. More specifically, the inputted image is segmented into the micro areas each taking a rectangular shape, and the segmented micro areas are exchanged with each other. This scheme has a greater scrambling count and enables strength of the encryption to a greater degree than by the method of conducting the exchanges in the horizontal direction (row) and in the vertical direction (column) described above.

Figure 21:
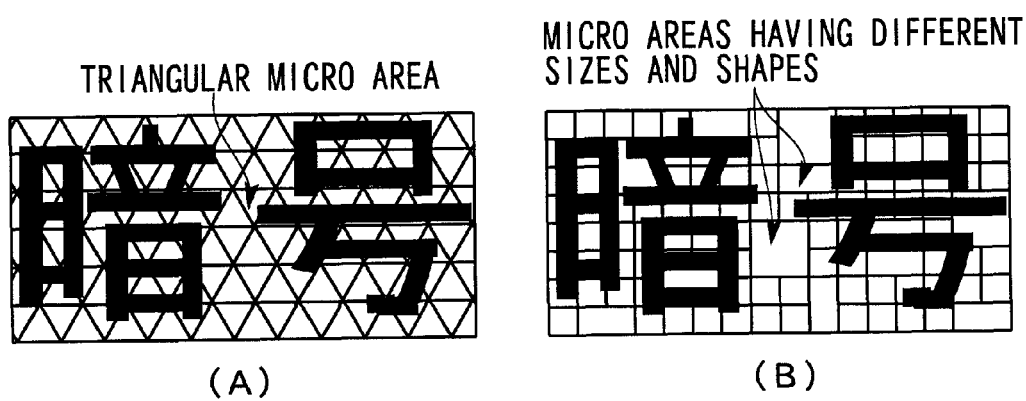
FIG. 21 A diagram showing a modified example of a shape of a micro area in the scramble process.

FIG. 21 is a diagram showing modified examples of the shape of the micro area in the scramble process. Further, the shape of the micro area when executing the scramble process can include, e.g., a triangle as illustrated in (A) of FIG. 21 in addition to the rectangle illustrated in FIG. 20. Moreover, as illustrated in (A) of FIG. 21, the micro areas having different shapes and different sizes can coexist as shown in (B) of FIG. 21.

Next, the converting method based on the image compressing process will be described.

Figure 22:
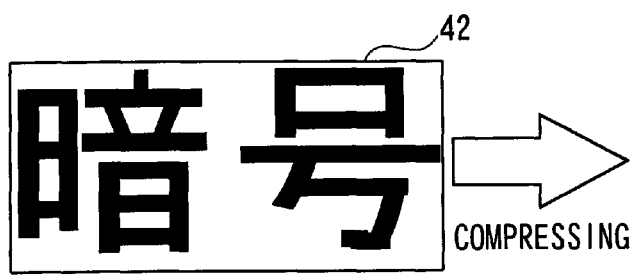
FIG. 22 A diagram showing a compressing process in the image converting unit.

FIG. 22 is a diagram showing a compression process in the image converting unit. When the input image 41 is a binary image, at first, as illustrated in (A) of FIG. 22, a binary string 71 as shown in (B) of FIG. 22 is generated by compressing an image of the area 42 selected by the encryption area designating unit 31. A compression method herein can involve applying all types of compression methods such as a run-length compression method used for transferring binary image data in a facsimile apparatus and a JBIG (Joint Bi-level Image experts Group) compression method defined as a standard compression method for the binary image.

Figure 23:
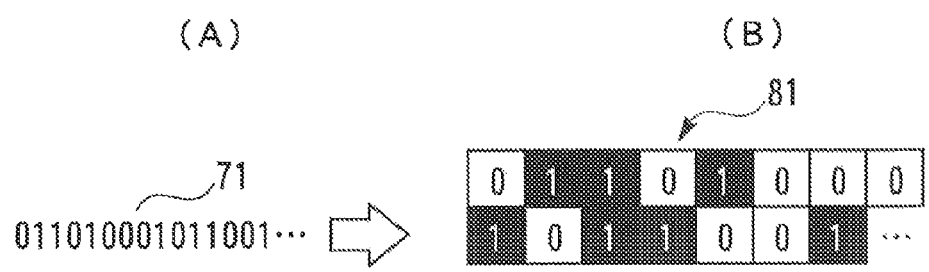
FIG. 23 A diagram showing a process of transforming converted image into an image.

FIG. 23 is a diagram showing a process of transforming the converted data into the images. As shown in FIG. 22, subsequent to the compression of the area 42, the respective bits of the binary string defined as the converted compression data are arrayed as black-and-white square images 81 in the area 42 of the image to be encrypted in a way that generates the square images (processed images) 81 by enlarging [0] bits as [white] squares and [1] bits as [black] squares in a designated size as illustrated in (B) of FIG. 23.

If desired to array the converted compression data (binary string 71) within the image of the selected area 42, the size of the square image 81 depends on a compression rate of the selected area 42. For example, if the compression rate is equal to or smaller than ¼, the size of the square image 81 is equivalent to (2×2) pixels at most, and, if equal to or smaller than 1/16, the size is equivalent to (4×4) pixels at most.

On the other hand, if desired to designate the size of the square image 81 and to arrange the compressed data within the image of the area 42, it is necessary for attaining a compression rate depending on the size of the square image 81 in the first image compression process. In the case of setting the square to, e.g., a (4×4) pixel size, the compression rate equal to or larger than 1/16 is needed. In this case, effective methods are a method of previously compressing the information in the selected area 42 and an irreversible compression method.

The encryption process of transforming the compressed data into the image in enlargement enables the enlarged black-and-white blocks to be recognized even when reading the encrypted image with, e.g., a low-resolution camera, and hence the encrypted image can be correctly decrypted.

The discussion gets back to the illustration in FIG. 16. A pixel value converting unit 33 converts at fixed intervals the pixels within the processed image 63 converted by the image converting unit 32, thus making the converted image 43 take substantially a grating-shaped striped pattern.

Figure 24:
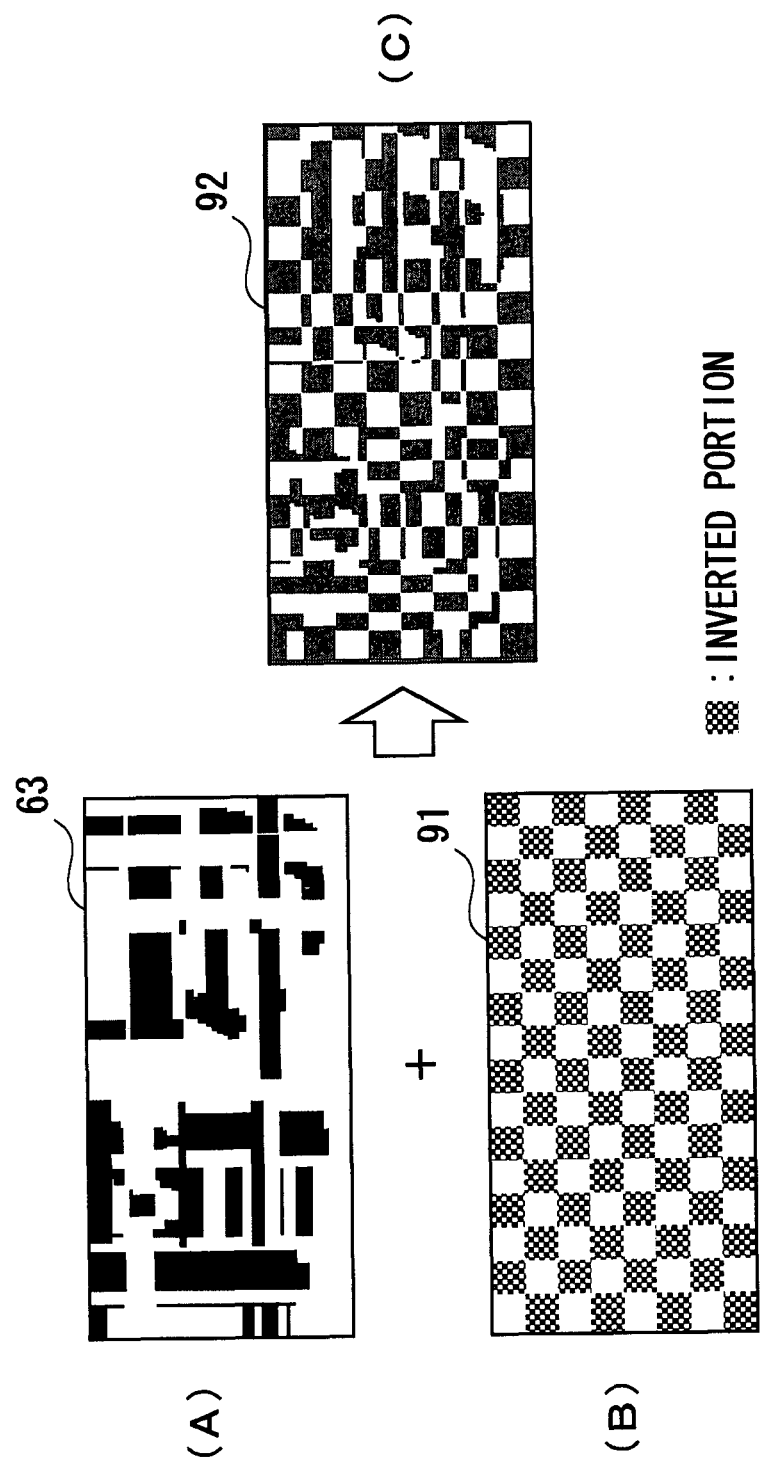
FIG. 24 A diagram showing an example (part 1) of a pixel value converting process in a pixel value converting unit.

FIG. 24 is a diagram showing an example (part 1) of a pixel value converting process. The pixel value converting unit 33 converts at the fixed intervals the pixels of the processed image 63 into which the area is scrambled by the image converting unit 32, whereby the encrypted image 44 takes substantially the grating-shaped striped pattern as a whole. For example, as illustrated in FIG. 24, a converted image 92 in which the encrypted image 44 takes substantially the grating-shaped striped pattern on the whole is acquired as shown in (C) by executing such conversion that the scramble image 63 shown in (A) of FIG. 24 is inverted (inversion process) with colored portions of a checkered pattern image 91 illustrated in FIG. (B). The striped pattern to be generated is thereby used for detecting minute positions of the respective pixels within the encryption area when decrypting the encrypted image 44.

Another conversion can be carried out for a series of these processes. For example, the process of inverting the pixel values may also be a process of adding a designated value.

Further, a checkered pattern image 91 illustrated in (B) of FIG. 24 has substantially the same size as the scramble image 63 shown in (A) has, however, only the central area, excluding the peripheral area, of the scramble image 63 may also be subjected to the inverting process.

Figure 25:
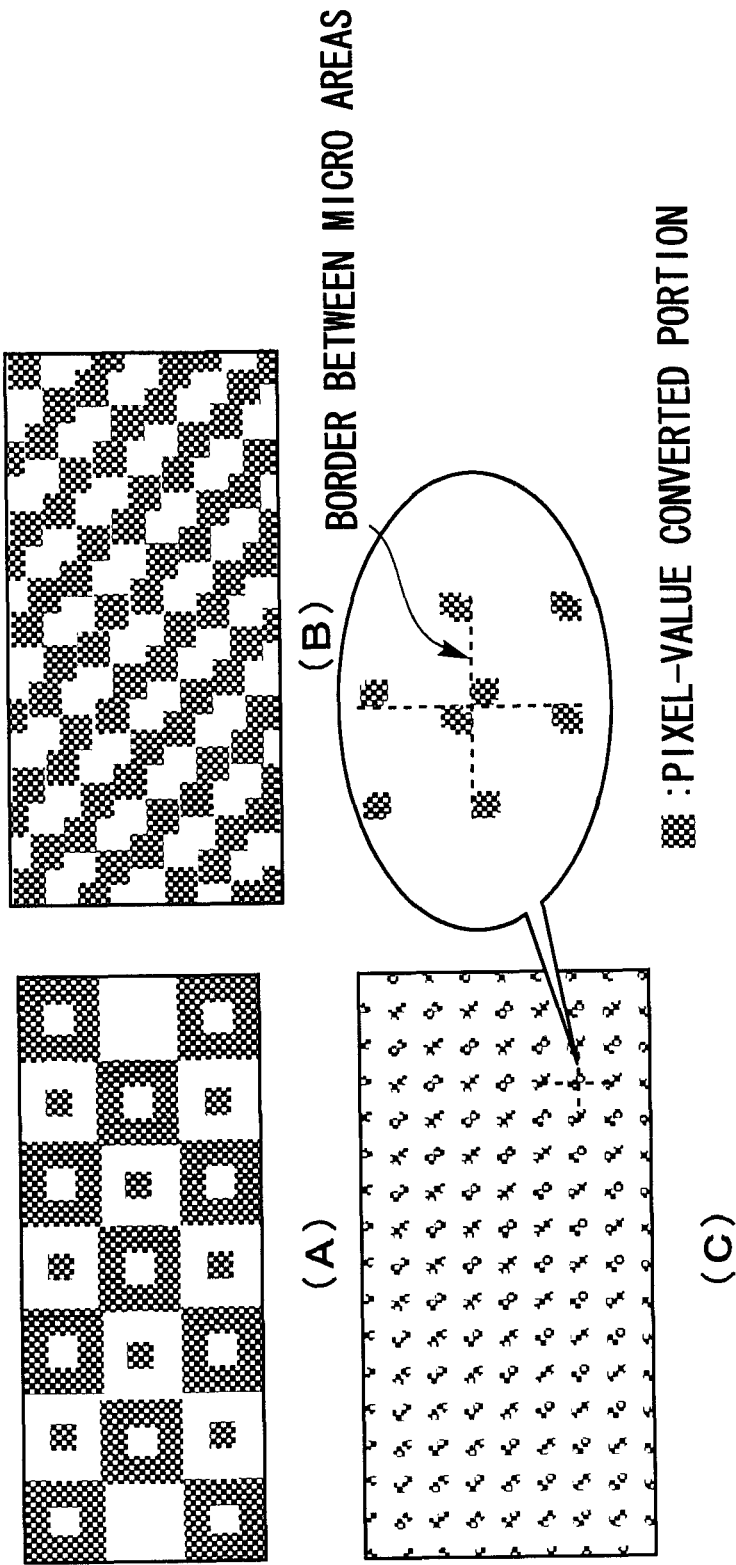
FIG. 25 A diagram showing an example (part 2) of the pixel value converting process in the pixel value converting unit.

FIG. 25 is a diagram showing an example (part 2) of the pixel value converting process by the pixel value converting unit. Moreover, a variety of shapes as illustrated in (A) through (C) of FIG. 25 can be applied to the area 42 in which to convert the pixel values. The conversion of the pixel values is a process aiming at detecting the border position between the micro areas with the high accuracy, and hence it is considered that, e.g., as in (A) of FIG. 25, only the border portions are pixel-value-converted. Further, as in (B) of FIG. 25, the borders between the conversion and the non-conversion appear at much minuter intervals by converting the pixel values while shifting little by little with respect to the micro areas, whereby the positions of the pixels of the encrypted image 44 can be detected in much greater detail in the decrypting process. Moreover, as in (C) of FIG. 25, only portions, in which the borders between the micro areas, are pixel-value-converted, thereby enabling deterioration of an image quality to be restrained to the minimum when reading and decrypting the images printed on a sheet of paper etc. with the scanner and the camera.

Herein, such a postscript is added that if the shape of the micro area is not the square having a uniform size and if the micro areas are triangular ((A) of FIG. 21) or if the micro areas having different sizes and different shapes coexist (B) of FIG. 21), the pixel values are required to be converted by methods corresponding to the shapes without being limited to the conversion examples given above.

As described above, the present invention takes not the scheme that the regular patterns representing the encrypted positions are generated in the way of being overwritten on the inputted image as in Patent document 1 but the scheme that the regular patterns are generated by converting the pixel values of the inputted image. Accordingly, it does not happen that the image information of the edge portions of the encrypted image are sacrificed as by the prior arts, and the encryption can be done at the high efficiency in the form of making the position detecting information coexist with the original image information.

Note that if the pattern forming portions contain some pieces of image information, the regularity thereof is lost more or less, however, as will be mentioned about the process of the decrypting unit 14 that will be described later on, the encrypted positions can be detected by making use of statistical characteristics of the whole encrypted image.

The discussion gets back to the illustration in FIG. 16. The marker adding unit 34 adds positioning markers to, e.g., three corners other than the right lower corner among the four corners of the converted image 92 undergoing the converting process by the pixel value converting unit 33, thereby generating the encrypted image 44.

The marker adding unit 34 allocates the positioning markers for specifying the position of the encryption area 42 to the three corners excluding the right lower corner among the four corners of the converted image 92.

FIG. 26 is a diagram illustrating examples of the positioning markers used for the encryption process. The positioning marker used in the first mode takes, it should be assumed, a circled cross as illustrated in (A) of FIG. 26. The shape of the positioning marker may be in a broader sense formed by the circle or a polygon of a solid line and a plurality of lines intersecting the periphery thereof. This is exemplified such as a shape of [intra-square cross] which resembles kanji character [田] used as the positioning marker in (B) of FIG. 26, a circled Y consisting of three lines extending radially toward the periphery from the center as in the case of the positioning marker in (C), and a circled centrally-voided cross (lines disconnected at the center) as in the case of the positioning marker in (D).

Moreover, a color combination of the positioning marker may be such that most simply the background is white, while the foreground is black, however, it does not cause any inconvenience to properly change the color combination corresponding to a color (pixel values) distribution of the converted image 92 without being limited to the color combination given above. Further, a thinkable method is not that the determined colors are designated for the background and the foreground but that the positioning marker is formed by inverting the pixels values of the foreground while the background color is set to an as-is color of the digital image 41. With this contrivance, the image is encrypted while retaining the input image information of the positioning marker.

Figure 27:
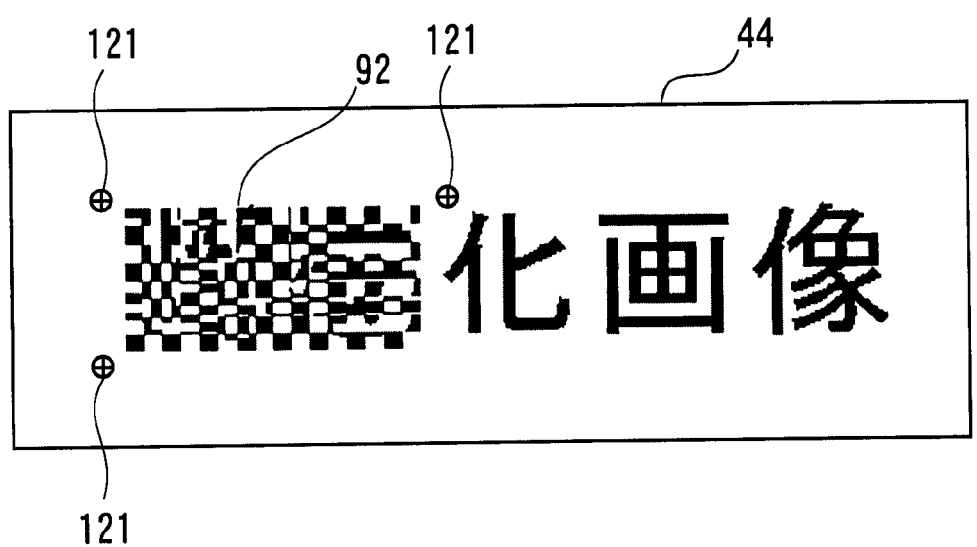
FIG. 27 A diagram showing an example of the encrypted image.

FIG. 27 is a diagram illustrating an example of the encrypted image. By the processes of the encrypting unit 11A, finally the encrypted image as illustrated in FIG. 27 is generated. The encrypted image 44 contains the converted image 92 and a positioning marker 121.

Moreover, in the encrypting method according to the first mode, when the image converting unit 32 adopts the [micro area rearranging process (scramble process)], the encryption process can be applied to a gray-scale image and a color image as well as to the binary image.

Figure 28:
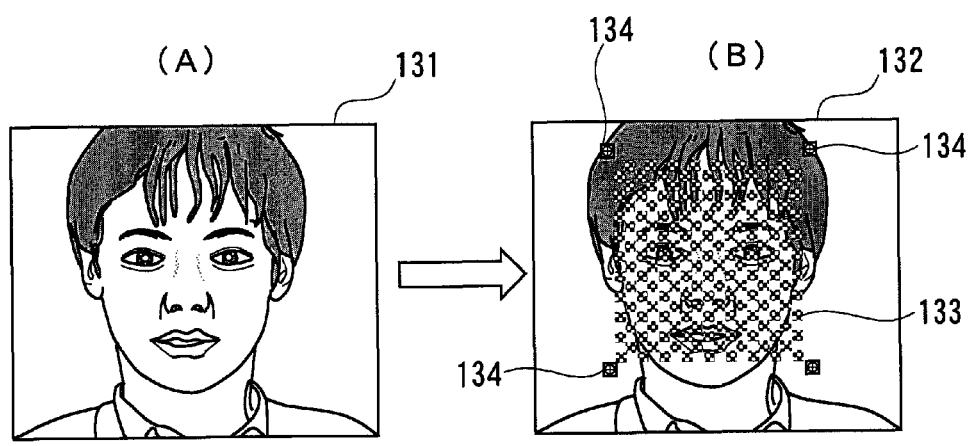
FIG. 28 A diagram of an example of encrypting a gray-scale image.

FIG. 28 shows an example of how the gray-scale image is encrypted. In FIG. 28, a gray-scale image 131 illustrated in (A) is subjected to the process by the encrypting unit 11A, thereby generating an encrypted image 132 containing a converted image 133 and a positioning marker 134 as illustrated in (B).

Next, the decrypting unit 14A will be described.

Figure 29:
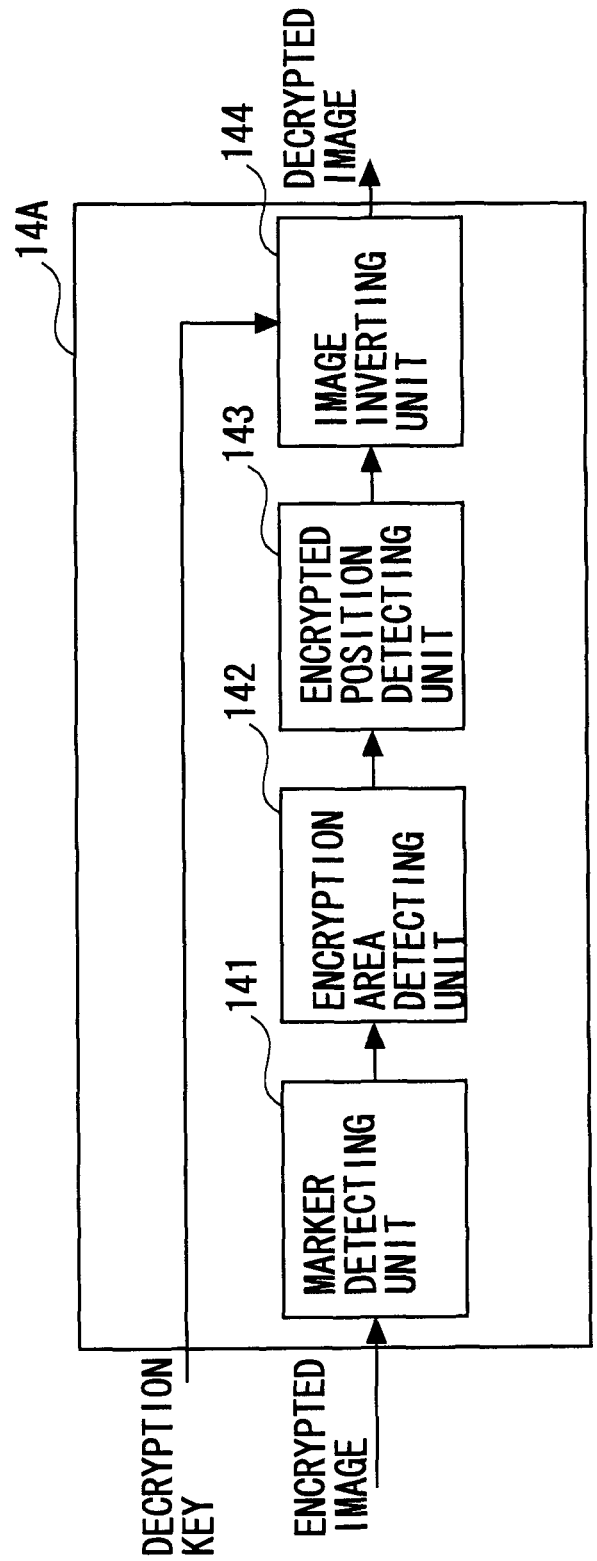
FIG. 29 A diagram showing an outline of a decrypting process in the first mode.

FIG. 29 is a diagram showing an outline of the decrypting process in the first mode. In FIG. 29, the decrypting unit 14A includes a marker detecting unit 141, an encryption area detecting unit 142, an encrypted position detecting unit 143 and an image inverting unit 144.

The marker detecting unit 141 detects, from the encrypted image, a position of the positioning marker added by the marker adding unit 34 in a way that uses a general image recognition technology. An applicable method as the detecting method involves using pattern matching and analyzing connectivity of graphics.

The encryption area detecting unit 142 detects the encrypted image area on the basis of the positional relation between the three positioning markers detected by the marker detecting unit 141.

Figure 30:
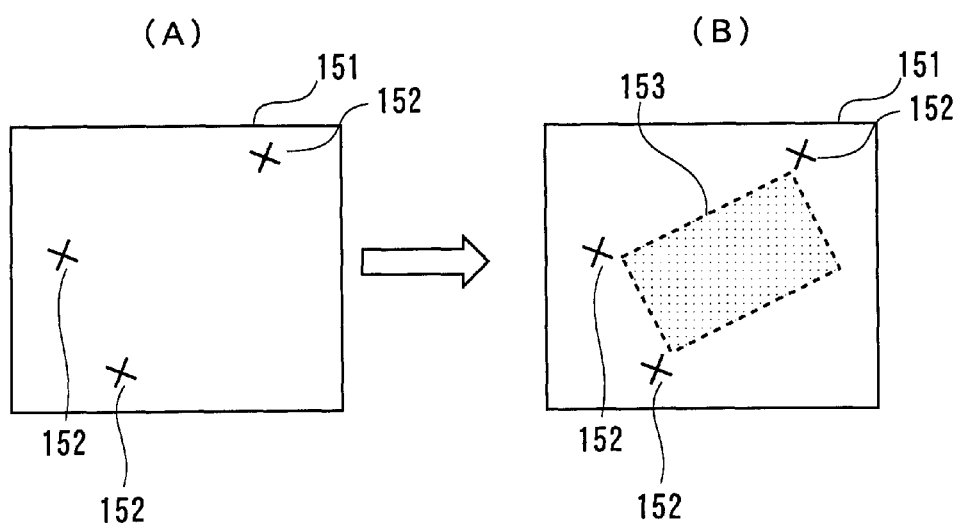
FIG. 30 A diagram showing a process of detecting the encryption area from the positioning marker.

FIG. 30 is a diagram showing a process of detecting the encryption area from the positioning marker. As shown in (A) of FIG. 30, when the marker detecting unit 141 detects at least three positioning markers 152 from the encrypted image 151, as illustrated in (B), one encryption area 153 can be detected. Namely, the three positioning markers 152 are disposed at the four corners of the rectangular encryption area 153, and hence a graphic form obtained by connecting these three points (the positions of the positioning markers 152) with lines becomes roughly a right-angled triangle. Then, if the three or more positioning markers 152 are detected, the positional relation between the three positioning markers 152 embraces an area taking a shape that is approximate to the right-angled triangle, and the encryption area 153 takes a rectangular shape in which the three positioning markers 152 correspond to three angular points among the four angular points. Note that if the number of the detected positioning markers 152 is equal to or smaller than "2", the corresponding encryption area 153 can not be specified, and hence the decrypting process is terminated on the assumption that the encrypted image does not exist.

Figure 31:
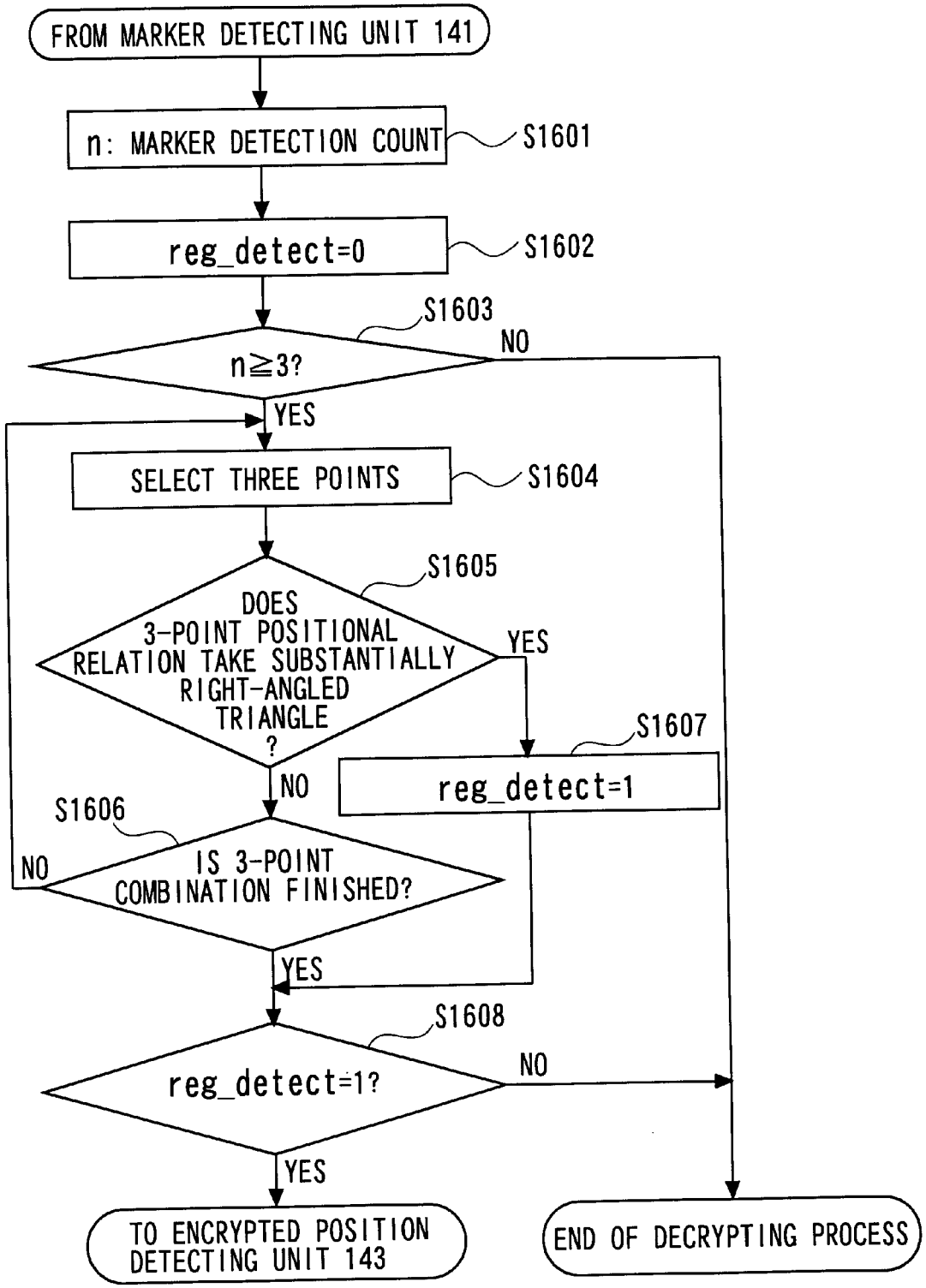
FIG. 31 A flowchart showing a flow of an encryption area detecting process.

FIG. 31 is a flowchart showing a flow of the encryption area detecting process. The encryption area detecting process executed by the encryption area detecting unit 142 starts with step S1601 in which the number of the positioning markers 152 detected by the marker detecting unit 141 is substituted into a variable n, and in step S1602, "0" is substituted into a detection flag "reg_detect" of the encryption area 153.

Then, in step S1603, it is determined whether or not the variable n, into which the number of the positioning markers 152 is substituted, is equal to or larger than "3", and, if the variable n is not equal to or larger than "3", i.e., if the variable n is equal to or smaller than "2" (step S1603: No), the decrypting process including the present encryption area detecting process is terminated.

While on the other hand, if the variable n is equal to or larger than "3" (step S1603: Yes), in step S1604, the three positioning markers 152 among the positioning markers 152 detected by the marker detecting unit 141 are selected, and, in step S1605, it is determined whether or not the positional relation between the thus-selected three positioning markers 152 takes substantially the right-angled triangle.

If the positional relation between the selected three positioning markers 152 does not take substantially the right-angled triangle (step S1605: No), in step S1606, it is determined whether or not a 3-point combination of the positioning markers 152 detected by the marker detecting unit 141 is completely finished, then, if not finished (step S1606: No), returning to step S1604, another set of three points is selected, and, when finished (step S1606: Yes), the operation proceeds to step S1608.

Whereas if the positional relation between the selected three positioning markers 152 takes substantially the right-angled triangle (step S1605: Yes), in step S1607, "1" is substituted into the detection flag "reg_detect".

Then, in step S1608, it is determined whether or not "1" is substituted into the detection flag "reg_detect", i.e., it is determined whether or not the three positioning markers 152 of which the 3-point positional relation takes the right-angled triangle can be detected, and the operation proceeds to a process by the encrypted position detecting unit 143 if "1" is substituted into the flag "reg_detect" (step S1608: Yes) and to the decrypting process including the present encryption area detecting process is finished whereas if "1" is not substituted into the flag "reg_detect" (step S1608: No).

The discussion gets back to the illustration in FIG. 29. The encrypted position detecting unit 143 detects minute positions of the respective pixels within the encryption area 153 by the frequency analysis and pattern matching in a way that makes use of a point that the edge portions of the encryption area 153 detected by the encryption area detecting unit 142 have a regular pixel distribution in order to accurately decrypt the encrypted image 151. This detection involves utilizing such a characteristic that the whole of the encrypted image 151 has the periodic pattern owing to the pixel value converting (inverting) process of the pixel value converting unit 33.

One thinkable detection method is a method of obtaining a pattern cycle (width) in horizontal and vertical directions of the image by use of a frequency analyzing method such as Fast Fourier Transform (FFT) and thereafter detecting the border positions (offset) by template matching etc.

Further, the border positions can be detected by Hough transform in a way that utilizes such a characteristic that the border portion becomes rectilinear when applying an edge detection filter (Laplacian filter etc.) to the encrypted image.

Figure 32:
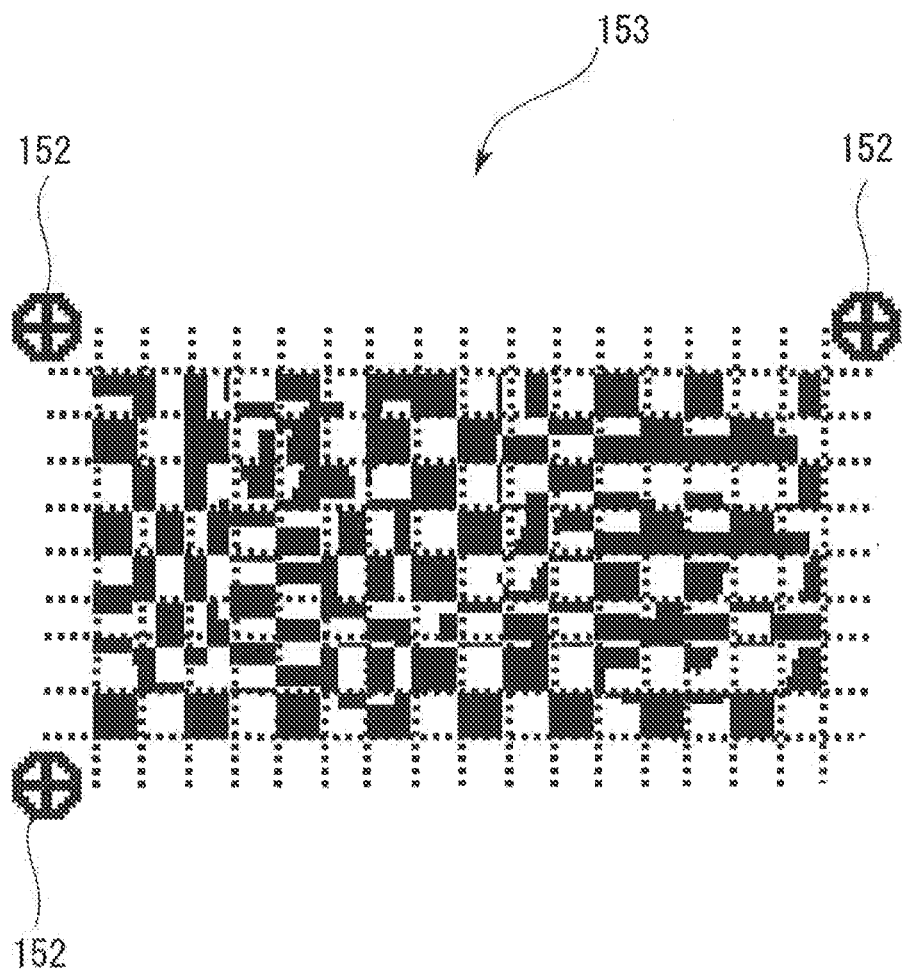
FIG. 32 A diagram showing an example in which an encrypted position is detected.

FIG. 32 is a diagram showing an example of how the encrypted positions are detected. If the input digital image 41 is complicated, a possibility is that a portion with a remarkably declined cyclicality of the encrypted image 44 might appear. In this case, an effective method is a method of detecting the encrypted positions in a way that limits the image area used for calculating the pattern cycle and the border positions to the portions exhibiting comparatively strong cyclicality.

The discussion gets back to the illustration in FIG. 29. The image inverting unit 144 executes, about the encrypted image 44, the inverting process of the converting process of the image inverting unit 32 on the basis of a method corresponding to a decryption key by use of the encrypted position information detected by the encrypted position detecting unit 143 and the decryption key inputted by a user, thereby generating a decrypted image. A procedure of the decrypting process is realized by the procedure reversed to the encrypting process, and hence its description is omitted. What has been discussed so far is the description of the first mode to which the present invention is applied.

Next, a second mode to which the present invention is applied will be described.

Figure 33:
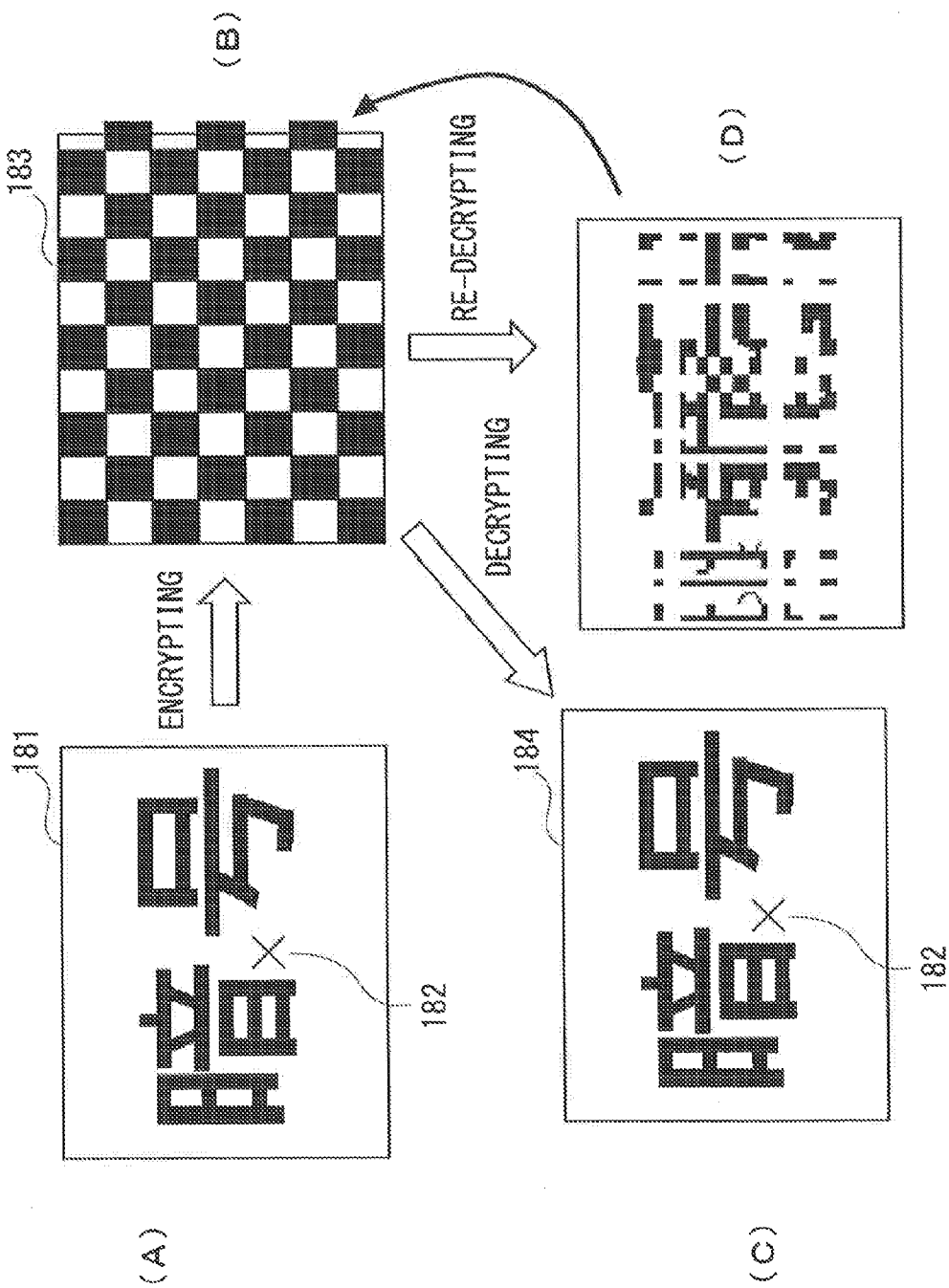
FIG. 33 A diagram illustrating a whole image in a second mode.

FIG. 33 is a diagram showing a whole image according to the second mode. The second mode is that before the encrypting process, a specified check mark 182 for verifying validity of decrypting the encrypted image 183 ((A) in FIG. 33) is attached to an arbitrary position of an area 181 to be encrypted, then the encryption is conducted ((B) in FIG. 33), the decryption is considered to be performed correctly if the check mark 182 attached beforehand is detected from the decrypted image 184 after decrypting the encrypted image 183, and the decrypting process is terminated ((C) in FIG. 33). Whereas if the check mark 182 is not detected ((D) in FIG. 33), the encrypted position is corrected, and the decrypting process is repeated till the check mark 182 is detected or till a designated standard is satisfied.

Figure 34:
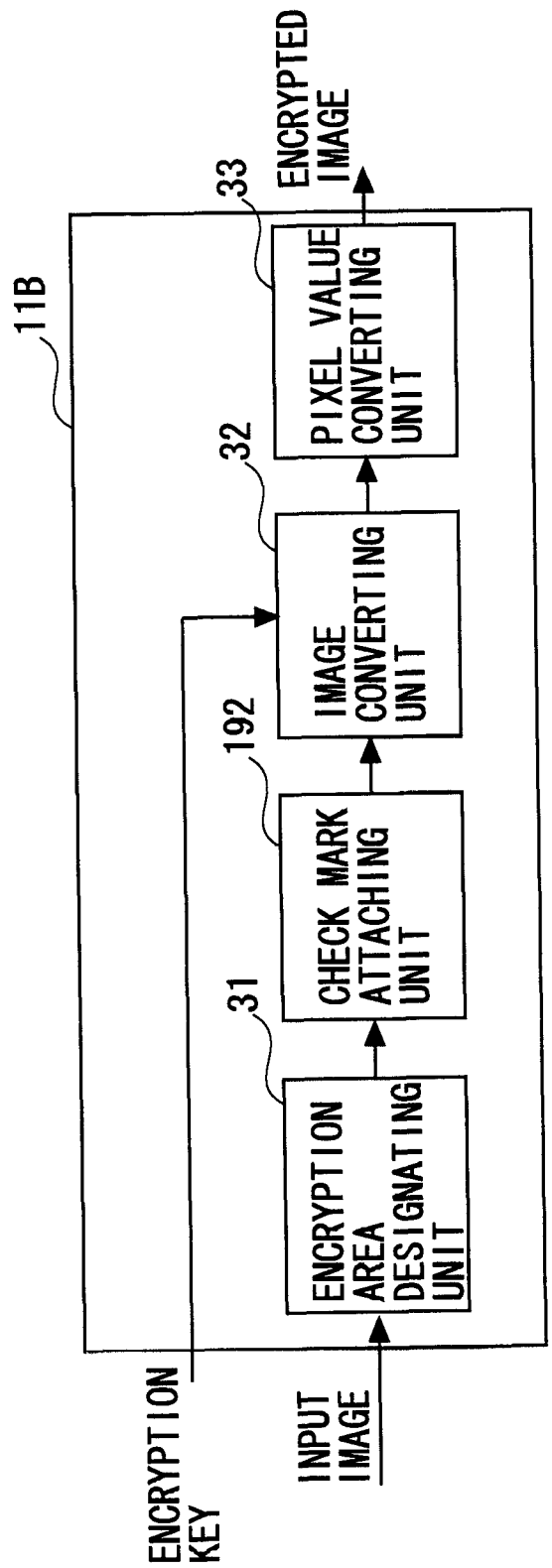
FIG. 34 A diagram showing an outline of the encrypting process in the second mode.

FIG. 34 is a diagram illustrating an outline of the encrypting process in the second mode. In FIG. 34, the encrypting unit 11B includes the encryption area determining unit 31, a check mark attaching unit 192, the image converting unit 32 and the pixel value converting unit 33.

In the same way as in the first mode, the encryption area designating unit 31 selects the to-be-encryption area from the input image containing a want-to-encrypt area.

Then, the check mark attaching unit 192 attaches the specified check mark 182 for verifying the validity of decrypting the encrypted image 183 to the arbitrary position of the area 181 to the encrypted. The check mark 182 is, it is desirable, attached to an area having, if possible, fewer image information and a flat pixel distribution.

After attaching the check mark 182 to the designated position, in the same way as in the first mode, the image converting unit 32 inputs the area 181 to be encrypted and the encryption key, an image of the area 181 to be encrypted is visually converted by the converting method corresponding to the encryption key, and the pixel value converting unit 33 converts at the fixed intervals the pixels within the processed image converted by the image converting unit 32, thus making the converted image take substantially the grating-shaped striped pattern.

Figure 35:
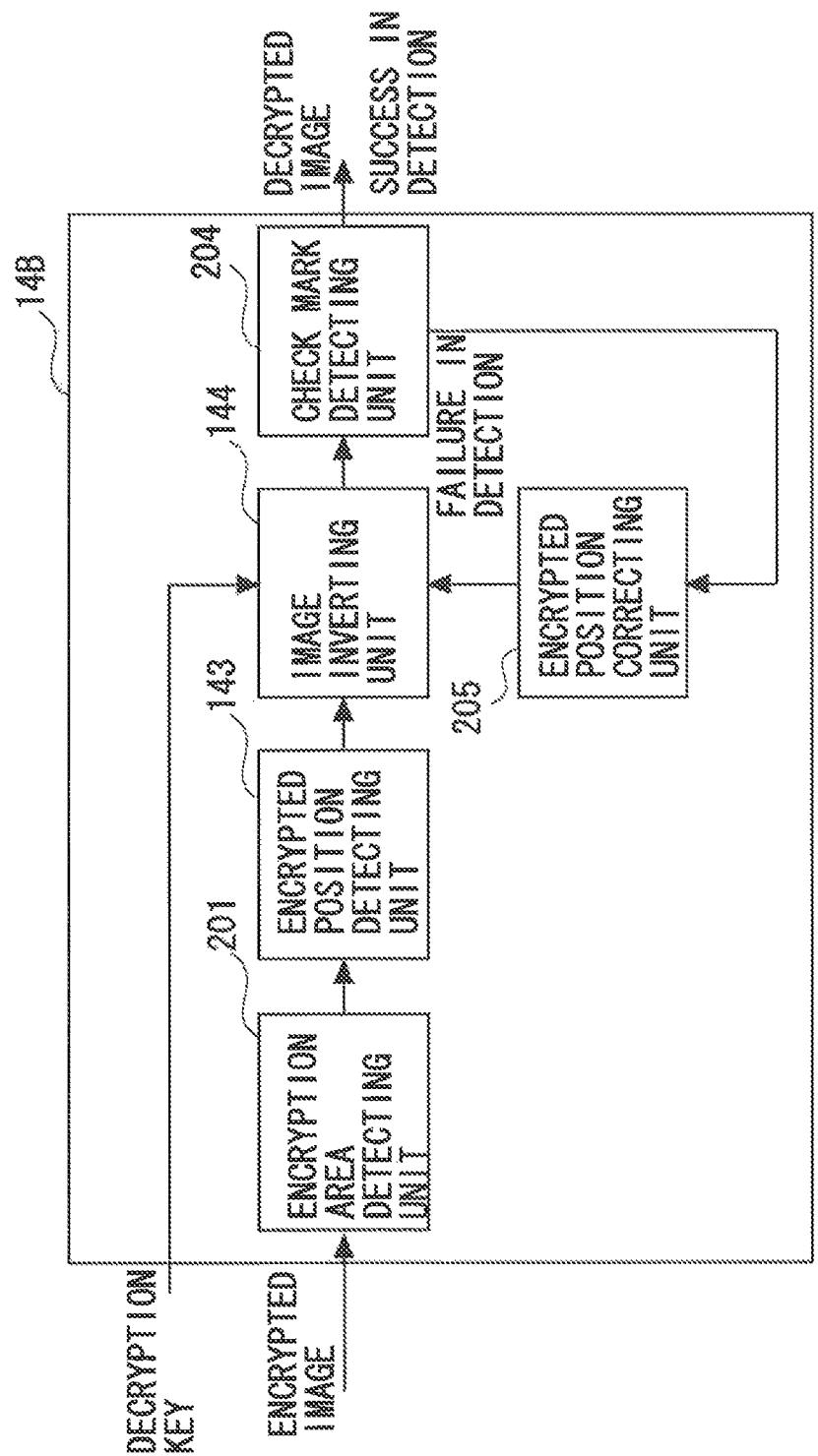
FIG. 35 A diagram showing an outline of the decrypting process in the second mode.

FIG. 35 is a diagram showing an outline of the decrypting process in the second mode. In FIG. 35, the decrypting unit 14B includes an encryption area detecting unit 201, an encrypted position detecting unit 143, an image inverting unit 144, a check mark detecting unit 204 and an encrypted position correcting unit 205.

To start with, the encryption area detecting unit 201 detects a rough area of the encrypted image 183. Through the encrypting process by the encrypting unit 11B, a pixel distribution of the encrypted image 183 takes roughly a checkered pattern, and therefore, if the frequency analysis such as FFT is conducted about the horizontal and vertical directions thereof, power of a frequency corresponding to a stripe cycle becomes conspicuously strong.

Figure 36:
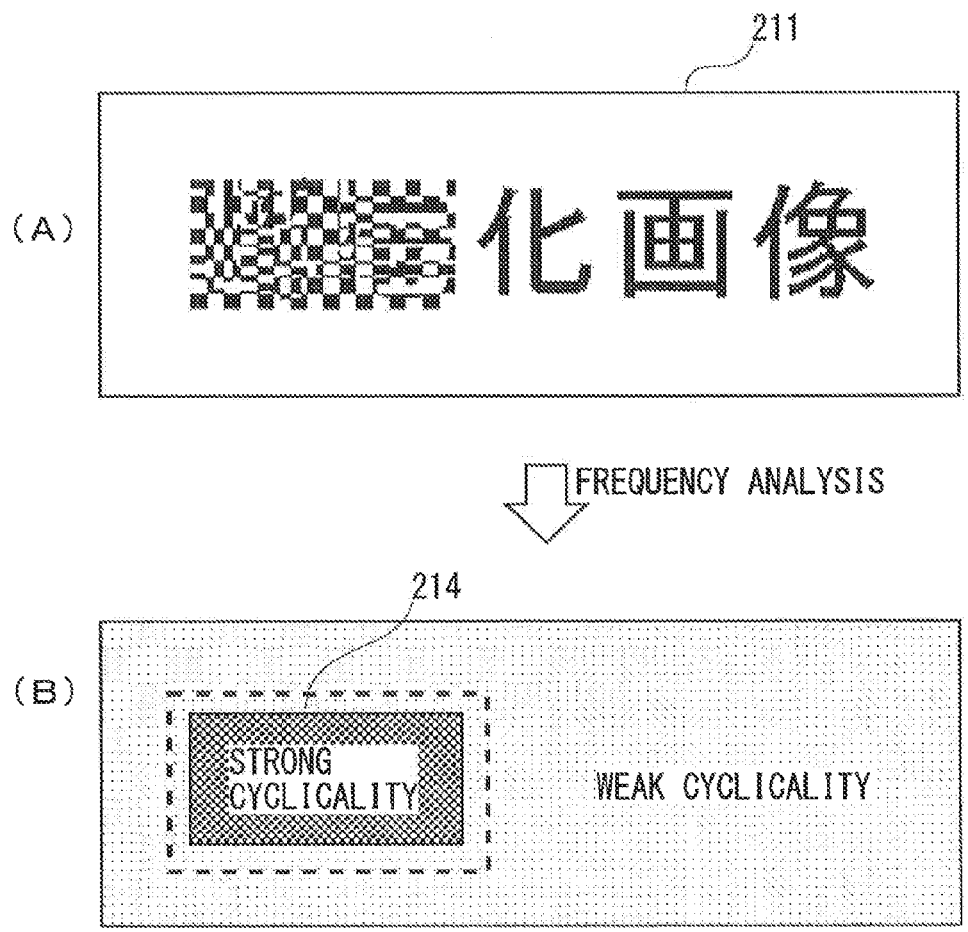
FIG. 36 An explanatory diagram of an encryption area detecting method.

FIG. 36 is an explanatory diagram of a method of detecting the encryption area. As illustrated in (A) of FIG. 36, when performing the frequency analysis about an encrypted image 211, as shown in (B), a power intensive area of a certain frequency is expressed as a [strong cyclicality] 214 (a frequency of an integral multiple of the former frequency). The cyclicality of the pixel distribution within the encryption area tends to be strong, and it is therefore feasible to detect a rough encryption area and a stripped striped pattern cycle.

The discussion gets back to the illustration in FIG. 35. The encrypted position detecting unit 143, after the encryption area detecting unit 201 has specified a rough encryption area, detects the encryption area more precisely, and simultaneously the minute positions of the respective pixels in the encryption area. Such a method can be considered as one example of the positional detection that the border position (offset) of the pixel-value conversion is obtained from the striped pattern cycle acquired by the encryption area detecting unit 201 and from an absolute pixel value difference distribution, and the areas exhibiting a comparatively large absolute pixel value difference are further narrowed down therefrom. Moreover, in the same way as by the encrypted position detecting unit 143 in the first mode, the detection of the encrypted position can involve using the Hough transform.

Figure 37:
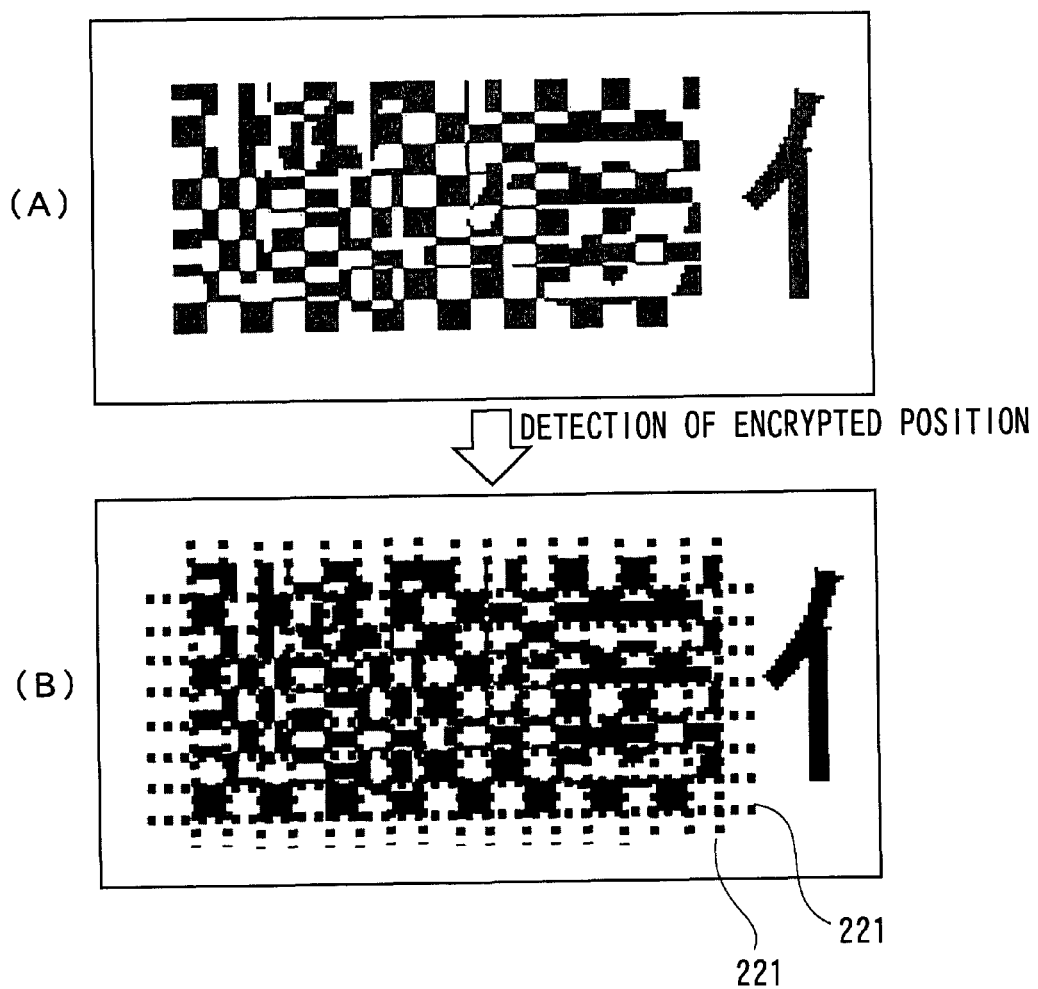
FIG. 37 An explanatory diagram of a method of detecting an encrypted position (in a horizontal direction).

FIG. 37 is an explanatory diagram of the method of detecting the encrypted position (in the horizontal direction). As stated above, when the encryption area detecting process described above is conducted respectively in the horizontal direction and in the vertical direction, as illustrated in FIG. 37, an encrypted position 221 is detected.

The discussion gets back to the illustration in FIG. 35. The image inverting unit 144 generates a decrypted image by executing the same method as in the first mode in a way that employs the information on the encrypted position and a decryption key.

The check mark detecting unit 204 tries to detect the check mark from the decrypted image decrypted by the image inverting unit 144. The detecting method is the same as the marker detecting process in the first mode, and hence its explanation is omitted. Then, when the check mark is detected, the decrypted image is output, and the process is terminated. When the check mark is not detected, the encrypted position correcting unit 205 corrects the encrypted position, and, till the check mark is detected or till a designated standard is satisfied, the decrypting process (image inverting process) is redone.

Figure 38:
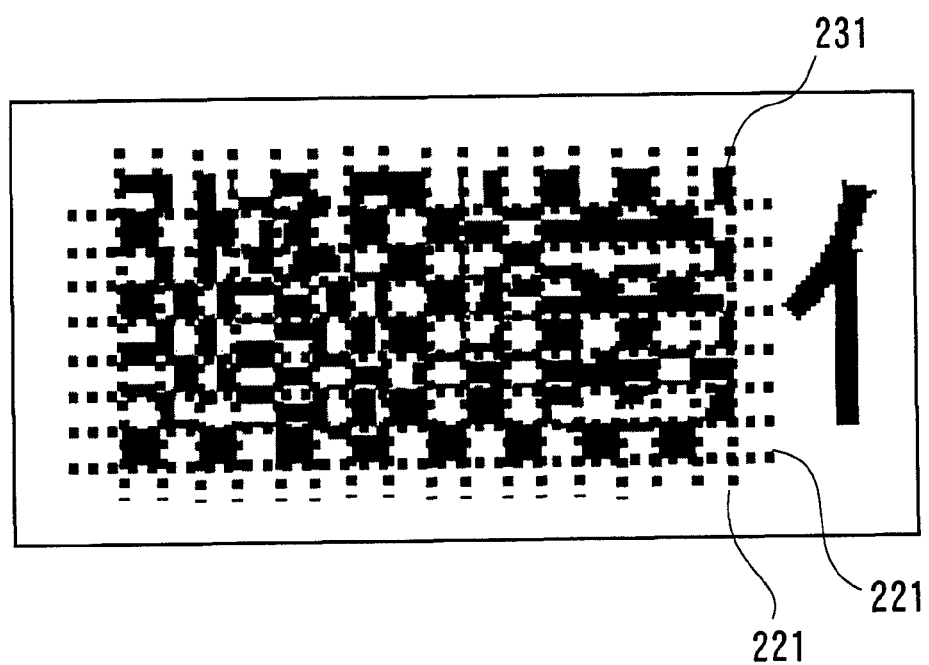
FIG. 38 A diagram showing an example of mis-detecting the encrypted position.

FIG. 38 is a diagram showing an example of how the encrypted position is mis-detected. As illustrated in FIG. 38, there is considered a case in which an edge of the encrypted image is overlooked (a fail-in-detection line 231). Such being the case, when failing to detect the check mark 182, lines representing the encrypted position 221 are added to or deleted from the left or right edge, and upper or lower edge, and the image inverting process is executed, thus examining in various ways whether the check mark 182 is detected or not. If the check mark 182 can not be detected by adding or deleting the lines in whatever manner, the process is ended without outputting the decrypted image. What has been discussed so far is the description about the second mode to which the present invention is applied.

Next, a third mode to which the present invention is applied will be described. The third mode of the present invention entails encrypting the image and decrypting the encrypted image by use of both of the positioning marker for specifying the encryption area that is exemplified in the first mode and the check mark for determining the validity of the decrypted image in the second mode. An image decryption error caused when the valid decryption key is inputted can be reduced by use of the two types of markers such as the position marker for the positional detection and the check mark for checking the decrypted image.

Figure 39:
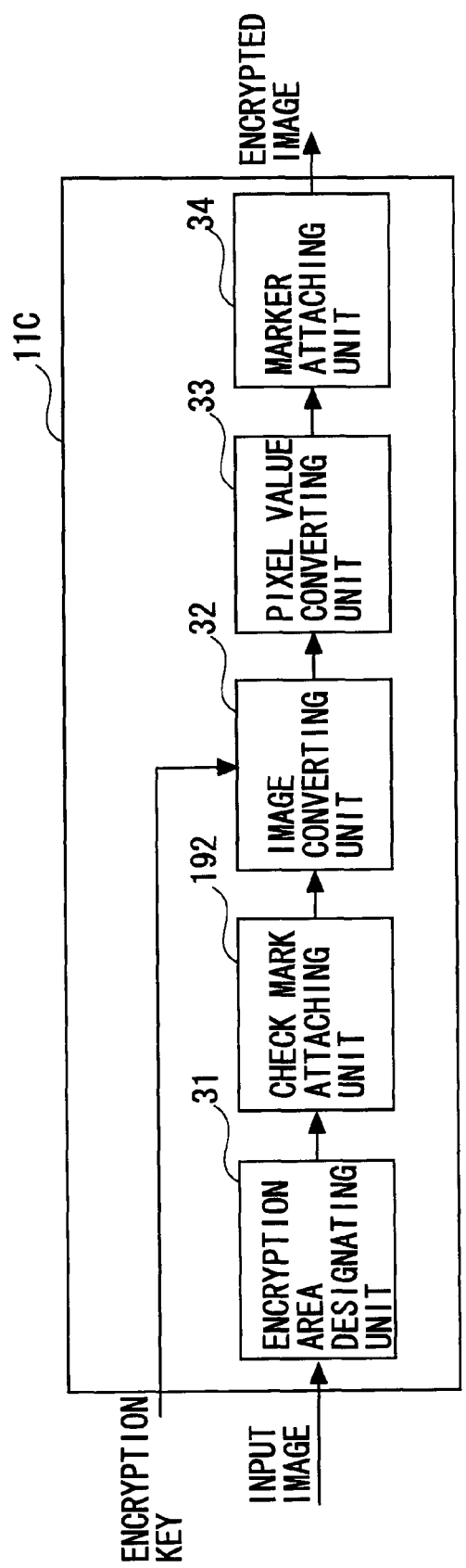
FIG. 39 A diagram showing an outline of the encrypting process in a third mode.

FIG. 39 is a diagram showing an outline of the encrypting process in the third mode. In FIG. 39, the encrypting unit 11C includes the encryption area determining unit 31, a check mark attaching unit 192, the image converting unit 32, the pixel value converting unit 33 and the marker attaching unit 34.

To begin with, the encryption area determining unit 31 selects the image area to be encrypted, and the check mark attaching unit 192 attaches the check mark for verifying the decryption by the same method as in the second mode. After attaching the check mark, the image converting unit 32 and the pixel value converting unit 33 encrypt the image by executing the image process by the same method as in the first and second modes, and the marker attaching unit 34 attaches the positioning marker for detecting the encryption area by the same method as in the first mode. The contents of the respective processes are the same as those in the first or second mode, and hence their explanations are omitted.

FIG. 40 is a diagram showing an outline of the decrypting process in the third mode. In FIG. 40, the decrypting unit 14C includes the marker detecting unit 141, the encryption area detecting unit 142, the encrypted position detecting unit 143, the image inverting unit 144, the check mark detecting unit 204 and the encrypted position correcting unit 205.

At first, the marker detecting unit 141 detects the positioning marker by the same method as in the first mode, and subsequently the encryption area detecting unit 142 detects the encryption area by the same method as in the first mode. Moreover, the encrypted position detecting unit 143 detects the minute positions of the respective pixels in the encryption area by the same method as in the first mode. Furthermore, the respective processing procedures executed by the check mark detecting unit 204 and the encrypted position correcting unit 205 are the same as those in the second mode, and hence their explanations are omitted. What has been discussed so far is the description about the third mode to which the present invention is applied.

What is claimed is:

1. A paper medium information encrypting system comprising:
   a digital image acquiring unit configured to acquire a digital image of information by capturing an image of a paper medium on which the information is recorded;
   an area designating information acquiring unit configured to acquire an area designating information on the basis of the information recorded on the paper medium;
   an encryption area designating unit configured to designate an encryption target partial area in the digital image acquired by said digital image acquiring unit;
   an image converting unit configured to convert the image of the partial area into a processed image on the basis of an encryption key;
   a pixel value converting unit configured to generate a converted image having a regularity at a spaced interval, used for specifying a position of the partial area when performing decryption, by adding a predetermined value to pixel values of the processed image according to a checkered pattern, without increasing a number of the pixels; and
   an output unit configured to output an encrypted image containing the converted image having the regularity at the spaced interval,
   wherein said encryption area designating unit designates, as the encryption target partial area, an area specified by the area designating information for specifying the encryption target partial area on the digital image.

2. A paper medium information encrypting system according to claim 1, further comprising an area designating information retaining unit configured to retain the area designating information in a way that associates the area designating information with identifying information for identifying the area designating information,
   wherein said area designating information acquiring unit acquires the area designating information associated with the identifying information in pieces of the area designating information retained by said area designating information retaining unit.

3. A paper medium information encrypting system according to claim 2, further comprising an identifying information acquiring unit configured to acquire the identifying information recorded on the paper medium from the digital image acquired by said digital image acquiring unit,
   wherein said area designating information acquiring unit acquires the area designating information associated with the identifying information acquired by said identifying information acquiring unit in the pieces of the area designating information retained by said area designating information retaining unit.

4. A paper medium information encrypting system according to claim 1, further comprising a keyword detecting unit configured to read a character string in the digital image acquired by said digital image acquiring unit and detecting a keyword contained in the digital image by comparing the readout character string with a keyword defined as a predetermined character string,
   wherein said area designating information acquiring unit acquires the area designating information by generating the area designating information for specifying an area associated with the keyword detected by said keyword detecting unit.

5. A paper medium information encrypting system according to claim 1, wherein said area designating information acquiring unit acquires the area designating information for designating a first partial area and a second partial area, and
   said image converting unit converts the first partial area and the second partial area into processed images based on encryption keys that are different from each other.

6. A non-transitory computer-readable medium storing a paper medium information encrypting program for making a computer, to which a paper medium imaging apparatus is connected, execute:
   acquiring a digital image of information by capturing an image of a paper medium on which the information is recorded;
   acquiring an area designating information on the basis of the information recorded on the paper medium;
   designating an encryption target partial area in the digital image acquired by said acquiring of the digital image;
   converting the image of the partial area into a processed image on the basis of an encryption key;
   generating a converted image having a regularity at a spaced interval, used for specifying a position of the partial area when performing decryption, by adding a predetermined value to pixel values of the processed image according to a checkered pattern, without increasing a number of the pixels; and
   outputting an encrypted image containing the converted image having the regularity at the spaced interval,
   wherein said designating of the encryption target partial area designates, as the encryption target partial area, an area specified by the area designating information for specifying the encryption target partial area on the digital image.

7. A paper medium information encrypting method by which a computer system including a paper medium imaging apparatus executes:
   acquiring a digital image of information by capturing an image of a paper medium on which the information is recorded;
   acquiring an area designating information on the basis of the information recorded on the paper medium;

designating an encryption target partial area in the digital image acquired in said acquiring of the digital image;

converting the image of the partial area into a processed image on the basis of an encryption key;

generating a converted image having a regularity at a spaced interval, used for specifying a position of the partial area when performing decryption, by adding a predetermined value to pixel values of the processed image according to a checkered pattern, without increasing a number of the pixels; and outputting an encrypted image containing the converted image having the regularity at the spaced interval, wherein said designating includes designating, as the encryption target partial area, an area specified by the area designating information for specifying the encryption target partial area on the digital image.

\* \* \* \* \*